US006370841B1

(12) United States Patent
Chudy et al.

(10) Patent No.: US 6,370,841 B1
(45) Date of Patent: Apr. 16, 2002

(54) AUTOMATED METHOD FOR DISPENSING BULK MEDICATIONS WITH A MACHINE-READABLE CODE

(75) Inventors: Duane S. Chudy, Lincolnshire; Richard A. Jobus, Crystal Lake; David A. Schultz, Palatine, all of IL (US)

(73) Assignee: AutoMed Technologies, Inc., Vernon Hills, IL (US)

( * ) Notice: Subject to any disclaimer, the term of this patent is extended or adjusted under 35 U.S.C. 154(b) by 0 days.

(21) Appl. No.: 09/454,042

(22) Filed: Dec. 3, 1999

(51) Int. Cl.⁷ .......................... B65B 61/02; B65B 59/00
(52) U.S. Cl. ............................ 53/411; 53/415; 53/445; 53/474; 221/10; 700/235
(58) Field of Search .................... 53/411, 415, 445, 53/474, 131.2–131.5, 136.1, 155, 168, 238, 239; 221/10; 700/235

(56) References Cited

U.S. PATENT DOCUMENTS

| | | |
|---|---|---|
| 3,556,342 A | 1/1971 | Guarr |
| 3,917,045 A | 11/1975 | Williams et al. |
| 3,998,356 A | 12/1976 | Christensen |
| 4,360,125 A | 11/1982 | Martindale et al. |
| 4,546,901 A | 10/1985 | Buttarazzi |
| 4,655,026 A * | 4/1987 | Wigoda ................... 53/238 X |
| 4,664,289 A | 5/1987 | Shimizu et al. |
| 4,733,362 A | 3/1988 | Haraguchi |
| 4,847,764 A | 7/1989 | Halvorson |
| 4,870,799 A | 10/1989 | Bergerioux et al. |
| 4,903,861 A | 2/1990 | Yuyama |
| 4,918,604 A * | 4/1990 | Baum ........................ 700/235 |
| 4,972,657 A | 11/1990 | McKee |
| 5,014,875 A | 5/1991 | McLaughlin et al. |
| 5,097,652 A | 3/1992 | Inamura et al. |
| 5,108,005 A | 4/1992 | Mosbacher |
| 5,208,762 A | 5/1993 | Charhut et al. |

(List continued on next page.)

FOREIGN PATENT DOCUMENTS

| | | |
|---|---|---|
| JP | 405085501 | 4/1993 |
| JP | 07267370 | 10/1995 |
| JP | 10149489 | 11/1996 |
| JP | 08-145495 | 2/1997 |

OTHER PUBLICATIONS

U.S. application No. 08/650,971, Yuyama, filed Feb. 1998.

U.S. application No. 09/021,864, Yuyama, filed Feb. 1998.

"AIC–RNC7/RNV7", Sanyo. Date: Not later than Dec. 3, 1997, probably early 1990s. (4 pages).

"Tosho Main–Topra Series PC–Cat", Tosho. Date: Not later than Dec. 3, 1997, probably 1993. (40 pages).

Yuyama catalog, Yuyama Mfg. Co., Ltd. Date: Not later than Dec. 3, 1997, probably 1995 or earlier (see second from last page). (34 pages).

(List continued on next page.)

Primary Examiner—Stephen F. Gerrity
(74) Attorney, Agent, or Firm—Jansson, Shupe & Munger, Ltd.

(57) ABSTRACT

An improved automated method for dispensing bulk medications with machine-readable code. The method includes dispensing oral solid and liquid unit-of-use medications in unit dosage amounts. The medications are dispensed with machine-readable information which is generated as the medication is dispensed. The machine-readable information is patient-specific and can be customized to suit the needs of the operator. The machine-readable information can be used to monitor and control the medication from the time it is dispensed through to the time it is taken by the patient.

35 Claims, 26 Drawing Sheets

U.S. PATENT DOCUMENTS

| | | | |
|---|---|---|---|
| 5,233,813 A | 8/1993 | Kenney et al. | |
| 5,253,783 A | 10/1993 | Freudelsperger | |
| 5,292,029 A | 3/1994 | Pearson | |
| 5,335,816 A | 8/1994 | Kaufman et al. | |
| 5,337,919 A | 8/1994 | Spaulding et al. | |
| 5,348,061 A | 9/1994 | Riley et al. | |
| 5,377,864 A | 1/1995 | Blechl et al. | |
| 5,401,059 A | 3/1995 | Ferrario | |
| 5,431,299 A | 7/1995 | Brewer et al. | |
| 5,460,294 A | 10/1995 | Williams | |
| 5,481,855 A | 1/1996 | Yuyama | |
| 5,528,882 A | 6/1996 | Yamamoto | |
| 5,533,606 A | 7/1996 | Yuyama | |
| 5,593,267 A | 1/1997 | McDonald et al. | |
| 5,597,995 A | 1/1997 | Williams et al. | |
| 5,604,692 A | 2/1997 | Yuyama | |
| 5,648,751 A | 7/1997 | Yuyama et al. | |
| 5,671,592 A | 9/1997 | Yuyama et al. | |
| 5,678,393 A | 10/1997 | Yuyama et al. | |
| 5,704,516 A | 1/1998 | Yuyama | |
| 5,709,063 A | 1/1998 | Yuyama et al. | |
| 5,713,485 A | 2/1998 | Liff et al. | |
| 5,713,487 A | 2/1998 | Coughlin | |
| 5,720,154 A | 2/1998 | Lasher et al. | |
| RE35,743 E | 3/1998 | Pearson | |
| 5,722,215 A | 3/1998 | Yuyama | |
| 5,758,095 A | 5/1998 | Albaum et al. | |
| 5,761,877 A | 6/1998 | Quandt | |
| 5,762,235 A | 6/1998 | Coughlin | |
| 5,765,342 A * | 6/1998 | Jensen et al. | 53/411 |
| 5,765,606 A | 6/1998 | Takemasa et al. | |
| 5,771,657 A | 6/1998 | Lasher et al. | |
| 5,787,678 A | 8/1998 | Koike et al. | |
| 5,798,020 A | 8/1998 | Coughlin et al. | |
| 5,803,309 A | 8/1998 | Yuyama et al. | |
| 5,800,113 A | 9/1998 | Yuyama et al. | |
| 5,810,061 A | 9/1998 | Yuyama | |
| 5,819,500 A | 10/1998 | Haraguchi et al. | |
| 5,832,693 A | 11/1998 | Yuyama et al. | |
| 5,838,245 A | 11/1998 | Murakami et al. | |
| 5,839,257 A | 11/1998 | Soderstrom et al. | |
| 5,839,836 A | 11/1998 | Yuyama et al. | |
| 5,852,911 A | 12/1998 | Yuyama et al. | |
| 5,852,971 A | 12/1998 | Yuyama et al. | |
| 5,862,942 A | 1/1999 | Yuyama et al. | |
| 5,875,610 A | 3/1999 | Yuyama et al. | |
| 5,905,652 A * | 5/1999 | Kutsuma | 700/235 |
| 5,946,883 A | 9/1999 | Yuyama et al. | |
| 5,964,374 A * | 10/1999 | Yuyama et al. | 221/10 X |

OTHER PUBLICATIONS

"Expand Your Pharmacy's Potential with the Total Automation Starter Kit from Baker APS", Baker APS. Date: Not later than Dec. 3, 1997, probably 1995. (20 pages).

"Automated Prescription Dispensing System", ScriptPro Pharmacy Automation. Date: Dec. 1995, copyright notice indicates date of 1996. (4 pages).

"AutoPak TM—A Fully Automated Unit Dose Packaging System", Medical Packaging, Inc. Date: Not later than Dec. 3, 1997, probably 1996. (2 pages).

"Yuyama Pharmaceutical Equipment General Catalog", Yuyama Mfg. Co., Ltd. Date: Possibly 1997 (see second page). (30 pages).

"Baker The Pharmacy Productivity Company—Pharmacy 1000" folder, Baker APS. Date: Not later than Dec. 3, 1997, probably Jun. 1997. (2 pages).

"We're Making Things Better . . . Particularly Things That Count!," The Baker Cells System, Baker APS. Date: Not later than Dec. 3, 1997, probably Jun. 1997. (8 pages).

"Remote Control Module," Baker APS Date: Not later than Dec. 3, 1997, probably Jun. 1997. (1 page).

"Pharmacy 1000," Baker APS Date: Not later than Dec. 3, 1997, probably Jun. 1997. (2 pages).

"Drug Cell With Read Out," Baker APS Date: Not later than Dec. 3, 1997, probably Jun. 1997, (1 page).

"The Computer Link," Baker APS Date: Not later than Dec. 3, 1997, probably Jun. 1997. (2 pages).

"Super Cell," Baker APS Date: Not later than Dec. 3, 1997, probably Jun. 1997. (1 page).

"Standard Cabinets," Baker APS Date: Not later than Dec. 3, 1997, probably Jun. 1997. (1 page).

"The New Generation Baker Cassette System Counting Module," Baker APS Date: Not later than Dec. 3, 1997, probably Jun. 1997. (2 pages).

Automated Healthcare, Inc., brochure, "RxOBOT" Date: Before Aug. 1997. (8 pages).

"AutoScript III from Baker APS," Baker APS Date: Not later than Dec. 3, 1997, probably Jun. 1997. (2 pages).

"The Baker AutoScript II, System," Baker APS Date: Not later than Dec. 3, 1997, probably Jun. 1997. (8 pages).

"PharmASSIST", Innovation Associates. Date: Not later than Dec. 3, 1997, probably Aug. 1997. (6 pages).

"PharmASSIST Order Entry Manual Filling . . . ", Innovation Associates. Date: After Aug. 1997, probably 1998. (7 pages).

"PharmASSIST—Signature Series Configuration, etc." Date: After Aug. 1997, probably 1998. (5 pages).

"ATC System—Proven Productivity From the Pharmacy to the Bedside and Beyond," Baxter Date: Copyright notice indicates 1994. (3 pages).

"Introducing the Universal Hands–Free," Baker APS Date: Undated. (1 page).

"Speed Accuracy and Productivity," Baker APS Date: Thought to be before Dec. 1998. (4 pages).

"Redefining Speed," Baker APS Date: Undated. (4 pages).

"Maximize Your Drug Security," Baker APS Date: Undated. (4 pages).

"Unleash The Power," Baker APS Date: Thought to be before Aug. 1997. (4 pages).

"The Pharmacy of the Future . . . Today!," Baker APS Date: Thought to be before Aug. 1997. (4 pages).

* cited by examiner

AutoFill System by AutoMed Technolgies Inc.   Page 1 of 1

St. Luke's Presbyterian Hospital                101

Jones, Michael — 127    11/08/1998 17:13    ID: 349560199

MICU  4B                 Fill For: 11/08/99

Order #:  — 128

---

Injectable Medications from AutoFill          Checked By _____

Sodium Chloride 0.9% (0.308 milliosmois/mL)        2 ml
Quantity: 1
Give at 8:00 am Heparin Sodium 5,000 USP   0.5 ml — 131
Quantity: 1
Give at noon Sodium Chloride 0.9% (0.308 milliosmois/mL)       10ml
Quantity: 1
Give at before bed

---

Oral Solid Medications from AutoFill          Checked By _____

M&Ms       packets: 3 (Quantity: 1 per Bag)
Give at 10:00 am, 4:00 pm and 10:00 pm
                                                    131
Skittles    packets: 1 (Quantity: 2 per Bag)
Give at 10:00 am TicTacs    packets: 2 (Quantity: 1 per Bag)
Give at 10:00 am. 10:00 pm

---

Medications to be Manually Picked           Checked By _____

None

---

Total: 6 med packets, 3 injectables, 0 Manual Items

FIG. 25

AUTOMATED METHOD FOR DISPENSING BULK MEDICATIONS WITH A MACHINE-READABLE CODE

FIELD OF THE INVENTION

This invention is related generally to automated dispensing technology and, more specifically, to an improved method for bulk dispensing of medication including information used to control and track patient medication orders.

BACKGROUND OF THE INVENTION

Automated dispensing of prescription medications, such as oral solid pills and liquid unit-of use ampules, is a well-known method of filling dosage-based prescriptions. Dosage-based prescriptions are filled in a way which organizes the medication into one or more dosage units by, for example, the time of day at which the medication is to be taken or the sequence in which the medication is to be taken. Dosage-based automated medication dispensing systems have particular utility in settings where large amounts of such prescription medications are required. Hospital formularies are ideal candidates for use of such dispensing systems. However, other businesses, such as mail order prescription filling services and pharmacies, can also use these systems.

Automated medication dispensing devices typically include one or more computer-controlled dispensing machines which store and dispense medications according to patient-specific prescription information. These automated medication dispensing devices offer many advantages. These advantages include the ability to store a broad range of prescription medications and the ability to fill patient prescriptions in a rapid and efficient manner. In addition, use of automated prescription filling equipment reduces the possibility of human error in filling patient prescriptions. Another advantage is that the cost savings from automated dispensing of medications can be used to employ more pharmacists and care givers who can provide personalized service to patients.

However, automated medication dispensing systems which attempt to dispense on a dosage unit basis have significant disadvantages. For example, certain dosage based systems are unable to fully utilize bulk medication dispensing technology. Bulk dispensing of medications involves the storage of pills or unit-of-use medications in bulk, for example in bins, magazines or canisters. The bulk-dispensed medications may be dispensed into containers according to patient-specific prescription information. As can be appreciated, bulk dispensing is most efficient when the medication is stored in a raw, non-prepackaged form since this permits great flexibility in the type of medications which can be dispensed and because the medications can be rapidly replenished in the bulk storage containers. Bulk dispensing becomes even more advantageous as the number and type of medications dispensed is expanded. For example, a hospital formulary is required to dispense dosage units of many different solid and liquid medications; an effective bulk dispensing system would be a particularly useful way to manage and control the distribution of such a diverse range of medications.

However, most prior art systems which provide dosage-based dispensing are required to store individual pills or medications in individual unit dosage packages and not in bulk. These separate unit dosage packages are stored within the dispensing device and must be separately retrieved to fill a patient's order. This is disadvantageous because it is difficult to arrange, customize and/or mix the pills comprising the patient's unit dosage. The process also requires time-consuming and expensive prepackaging of the medications to be dispensed. Such dosage-based systems are unable to realize the flexibility and cost savings benefits of bulk dispensing.

Another disadvantage of certain prior art dosage-based medication dispensing systems is that it is difficult to fully control and track the individual dosage units. The prepackaged dosage units used by these companies have preprinted information on the packages which is generic in nature and is not generated for the specific patient as the medication is dispensed. Such preprinted information might include National Drug Code ("NDC") information and a code for the storage location of the dosage unit within the dispensing. This information is limited and leaves little room for application of more patient-specific information such as the patient's name and other information which directly links the patient to the dosage unit. The Homerus system from Cardinal Health Care and the Robot Rx system from McKesson are representative dosage-based dispensers which include the foregoing disadvantages.

There are many potentially useful applications for the patient-specific information. For example, this information can be used at the completion of the filling process to verify that the correct medication has been supplied to the patient. The information could be used at the patient's bedside to create a record of the medication taken by the patient including the type and quantity of medication taken and the time of day at which the medication was taken. Patient-specific information on the medication packages could even be used for purposes of billing.

It would be a significant improvement in the art to provide an automated method for dispensing bulk medications in dosage form with real-time-generated machine-readable code so that the medication could be associated with a specific patient.

OBJECTS OF THE INVENTION

It is an object of this invention to provide an improved automated method of dispensing bulk medications overcoming problems and shortcomings of the prior art.

Another object of this invention is to provide an improved automated method of dispensing bulk medications with patient-specific machine-readable code affixed to the medication packaging.

It is also an object of this invention is to provide an improved automated method of dispensing bulk medications in which the machine-readable code affixed to the medication packaging can be used for many purposes including, without limitation, for verification that the order is correct and complete, for compliance with dosage protocols and for billing.

Another object of this invention is to provide an improved automated method of dispensing bulk medications in which patient-specific machine-readable code is affixed to the medication packaging in real time as the medication is dispensed.

A further object of this invention is to provide an improved automated method of dispensing bulk medications in which the prescriptions can be filled rapidly and economically.

Yet another object is to provide an improved automated method of dispensing bulk medications which avoids costly and time-consuming prepackaging steps.

An additional object of this invention is to provide an improved automated method of dispensing bulk medications which can be used with a wide range of medications including oral solid medications and unit-of-use liquid medications and other types of unit-of-use products.

How these and other objects are accomplished will be apparent from the descriptions of this invention which follow.

BRIEF DESCRIPTION OF THE DRAWINGS

The following description of an embodiment of the present invention is carried out with reference to the accompanying drawings, in which:

FIG. 25 is an example of an instruction sheet which can be dispensed with the medication including dosage instructions and machine-readable code information.

SUMMARY OF THE INVENTION

The method provides an improved manner of dispensing bulk medications into dosage units together with machine-readable drug prescription information that can be used to control and track patient medication orders. The machine-readable code may be affixed to the medication packaging in real time as the medication is dispensed so as to directly link a dosage unit to a specific patient. The machine-readable code may be creatively configured to include any suitable information such as the patient name and dosage instructions. Use of bulk dispensing is fast, economical and permits the dosage units to be customized to the requirements of the patient both with respect to the type of medications and the ordering of the medications for consumption by the patient. The machine-readable patient information can be used for many purposes incident to the actual dispensing of the medication.

In general, the method comprises the initial step of providing at least one person's drug prescription information to a computer for controlling one or more bulk medication dispensing devices. The bulk dispensing device or devices used in the method automatically dispense and package a predetermined quantity of solid medication into at least one dosage unit in response to a signal from the computer based on the person's drug prescription information. The dispensing device or devices automatically apply machine-readable drug prescription information to the solid medication package in response to a signal from the computer based on the drug prescription information.

The dispensing apparatus used in the method can also automatically dispense a predetermined quantity of packaged liquid medication from a second bulk dispensing apparatus in response to a signal from the computer based on the person's drug prescription information. The apparatus automatically provides machine-readable drug prescription information for application to the liquid medication package in response to a signal from the computer based on the drug prescription information. The packaged unit dosage packages are collected together with the machine-readable information so that the medication can be distributed to the person Additional aspects of the method are explained in the detailed description which follows.

DETAILED DESCRIPTION

Figure 1:
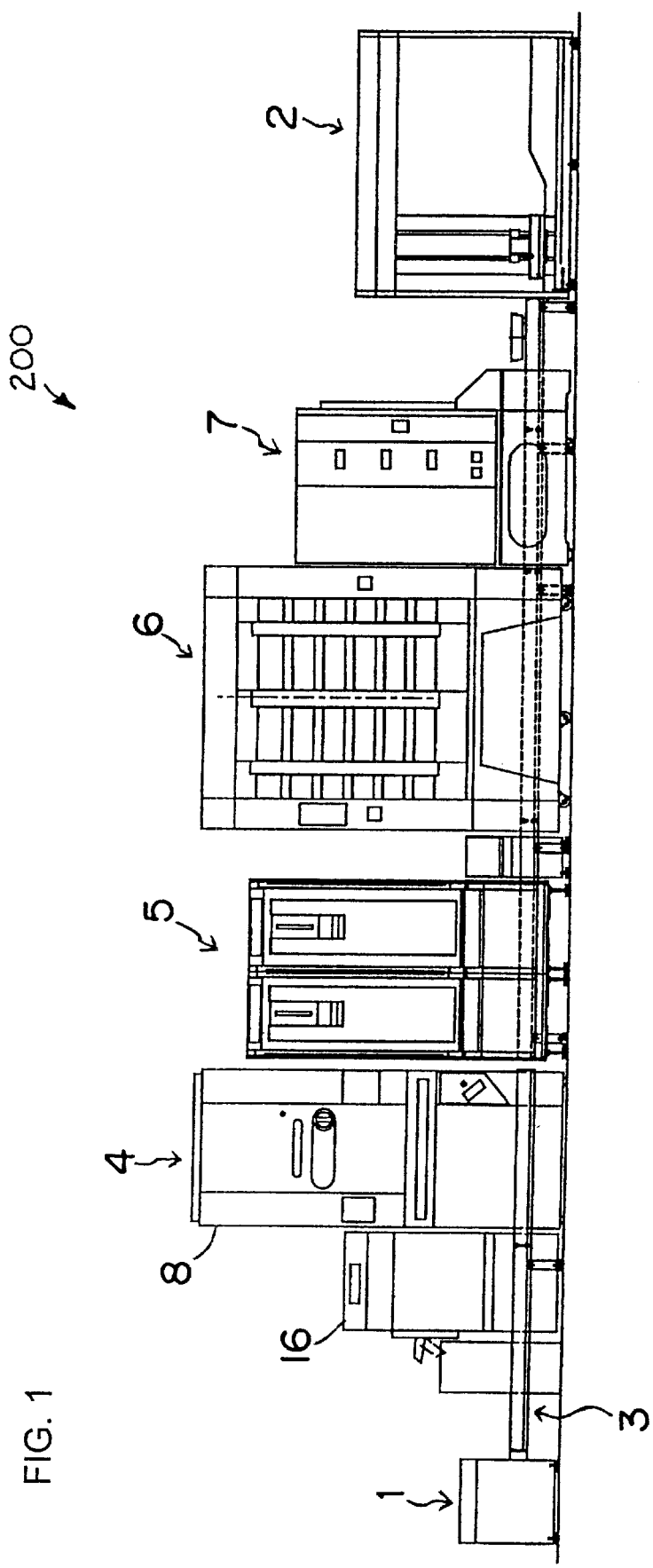
FIG. 1 is a schematic view of a medication collecting system according to an embodiment of the invention.

FIG. 1 shows a preferred embodiment of the apparatus used to perform many of the steps of the inventive method.

The apparatus is available from AutoMed Technologies, Inc. of Vernon Hills, Ill. and is sold commercially as the AutoFill System. One embodiment of such apparatus is described in U.S. patent application Ser. No. 09/205861, now U.S. Pat. No. 6,170,230 (Chudy et al.), the contents of which are incorporated herein by reference.

The exemplary medication dispensing system 200 shown in FIG. 1 includes a tablet dispensing station 4 an array ampule dispensing station 5, a random ampule dispensing station 6 and a label issuing station 7. These dispensers are disposed one after another along a conveyor line 3 that connects a tray feed station 1 and a tray recovering station 2 to each other.

These components are modular and can be configured and arranged to meet the needs of a specific operator. For example, additional tablet dispensing devices (such as tablet dispensing station 4) could be added to the system 200 as could additional ampule dispensing stations (such as ampule dispensing stations 5 and 6).

Conveyor line 3 need not be linear and can be configured to meet the space requirements of the particular operator.

Additional stations (not shown) can be added along the conveyor line. These stations might include automated unit-of-use dispensing devices for dispensing products such as intravenous solutions. In addition, stations consisting of pick-to-light storage shelf systems and non-automated storage shelf systems can be disposed along conveyor line 3 to provide an opportunity to place additional products and items into receptacles, shown as trays 9.

We now turn to a more specific description of a preferred embodiment of the dispensing apparatus used to practice an example of the method.

Tray Feed Station

Figure 2A:
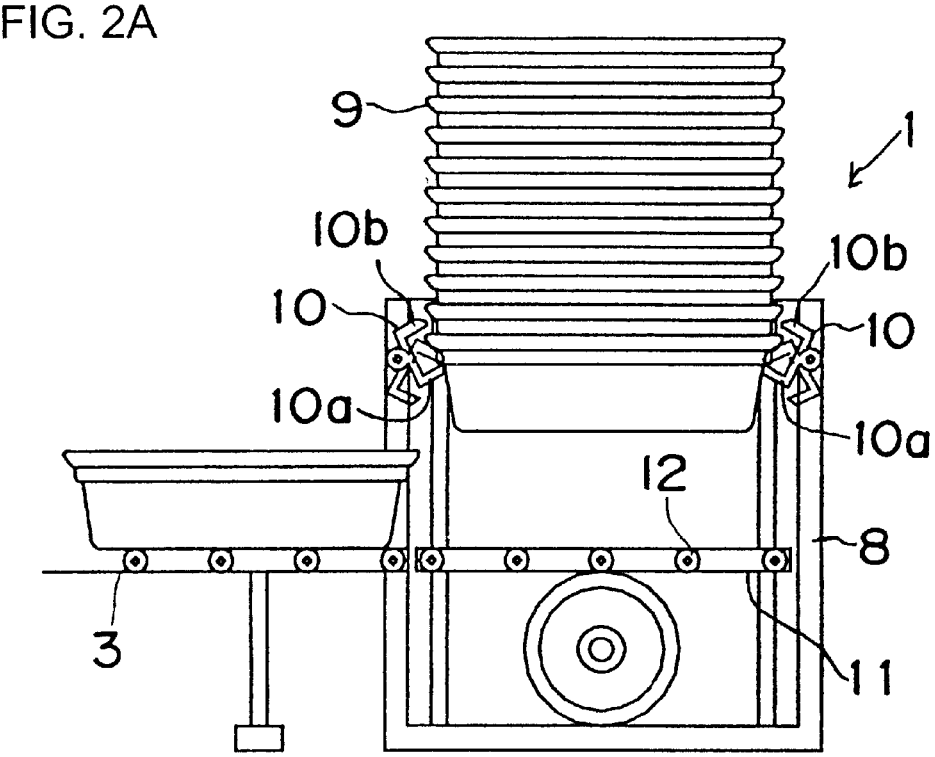
FIG. 2A is a front view of an initial state showing the tray discharging structure of the tray feed station.
Figure 2B:
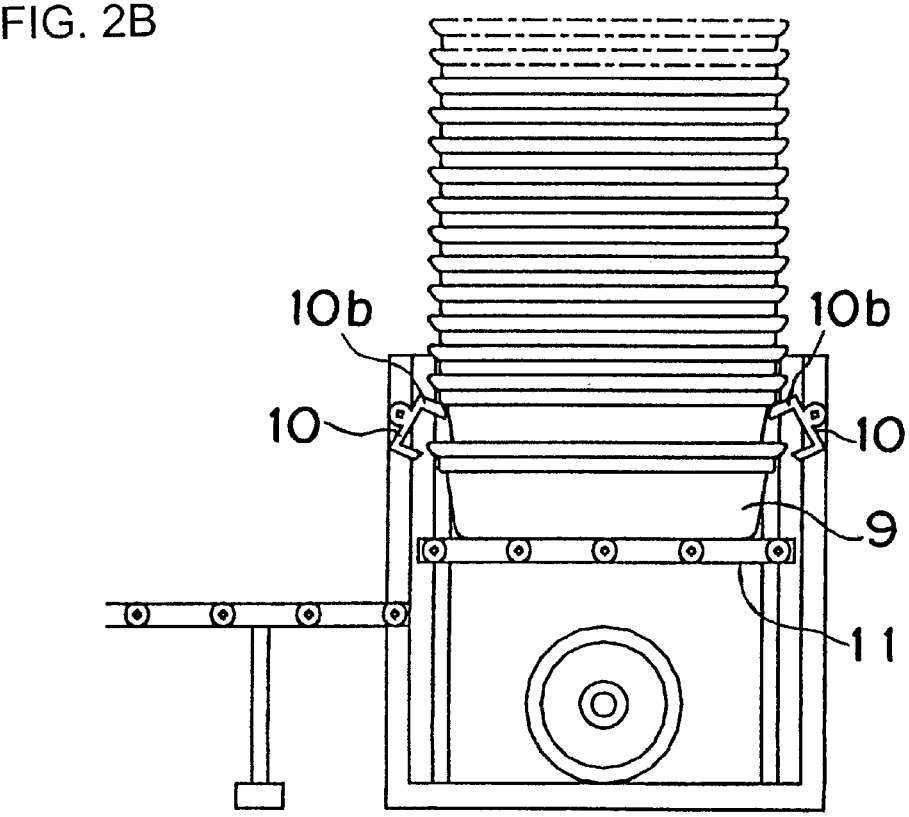
FIG. 2B is a front view in which the lowermost tray is discharged.

The tray feed station 1 is shown generally in FIG. 1. A plurality of trays 9 are stored in tray feed station 1 in a stacked state within a cylindrical housing 8 having a rectangular cross section as shown in FIG. 2A. Tray feed station 1 is enabled to feed out the trays 9 one by one. The housing 8 has, on its opposite sides, support feed claws 10 which are pivoted by an unshown motor or the like, respectively. The support feed claws 10 support peripheries of the lowermost tray 9 by their lower claw portions 10a and, by pivoting, place the lowermost tray 9 onto a feed-out plate 11 located below the lowermost tray 9. During this process, the support feed claws 10 support peripheries of the next tray 9 by their upper claw portions 10b as shown in FIG. 2B, thereby making it possible to take out only the lowermost tray 9. In addition, the support feed claws 10, after taking out the lowermost tray 9, return to the original position and support the next tray 9 by their lower claw portions 10a. The feed-out plate 11, which is guided by a lower opposite face of the housing 8, can be moved up and down by a motor or the like. This feed-out plate 11 has a plurality of rotation-drivable rollers 12 provided in parallel. In the lower operating position, the feed-out plate 11 is enabled to transversely convey the tray 9 placed through a lower opening of the housing 8 and feed out the tray 9 to the conveyor line 3.

Tablet Dispensing Station

Figure 3:
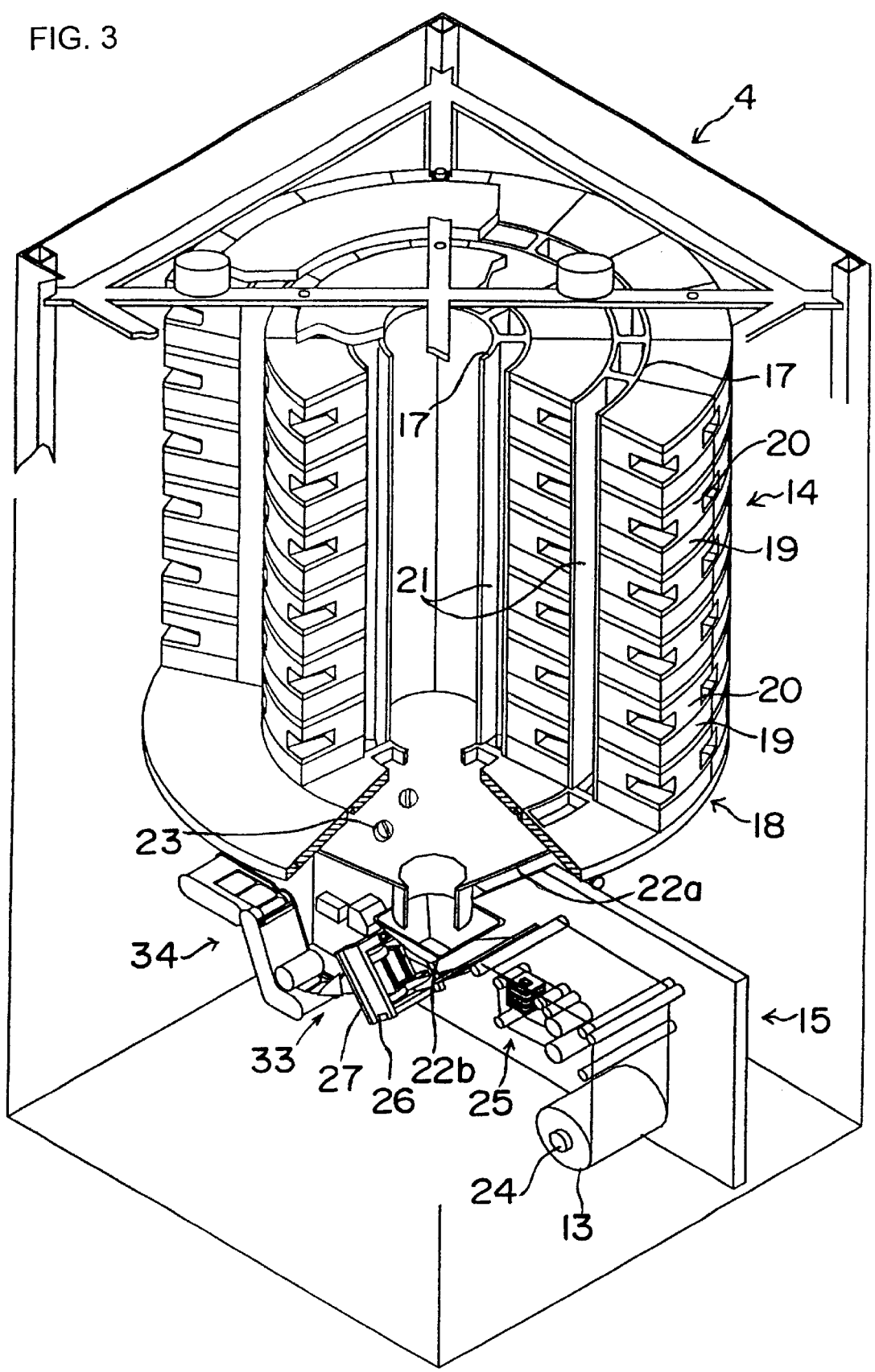
FIG. 3 is a partly broken perspective view showing the tablet dispensing station of FIG. 1.

The tablet dispensing station 4 shown in FIGS. 1 and 3 is provided to store bulk-form tablets 23 and to pack tablets 23 into a strip-shaped package belt 13 in doses. Tablet dispensing station 4, comprises a tablet feed section 14, a printing and packaging section 15 and a package-belt bundling section 16 (See FIG. 1).

The tablet feed section 14 comprises a cylindrical drum 18 equipped with inner and outer tablet guide parts 17 which extend up and down. The tablet feed section 14 comprises a plurality of motor bases 19 disposed vertically and circumferentially on the outer periphery of each tablet guide part 17, and a plurality of bulk storage tablet cassettes removably attached to the motor bases, respectively. Each tablet guide part 17 is divided circumferentially for each column of the vertically arrayed motor bases 19 and tablet cassettes 20, by which a tablet guide passage 21 extending vertically is formed. Below the cylindrical drum 18, are disposed hoppers 22a, 22b, which make it possible to collect tablets 23 dropping via the tablet guide passages 21 to one place.

In the tablet cassettes 20, different types of tablets 23 are stored, respectively, and tablets 23 amounting to one-day doses are discharged in units of one dose based on prescription information. This arrangement permits the operator to bulk store and dispense a broad range of tablets 23. The discharged tablets 23 are counted by sensors (not shown) provided on the motor bases 19, and fed to the printing and packaging section 15 via the hoppers 22 through the tablet guide passages 21. The number of tablets left in a tablet cassette 20 can be counted based on the initial number of pills stored and the count number by the sensor, allowing a decision as to whether or not the tablets 23 in cassette 20 have been depleted.

The printing and packaging section 15 comprises a roll 24 on which the package belt is wound, a printing part 25 for applying specified print on the surface of the package belt 13, a sealing part 26 for sealing the package belt 13 in doses, and a cutter part 27 for cutting the package belt 13 into specified lengths.

Figure 4:
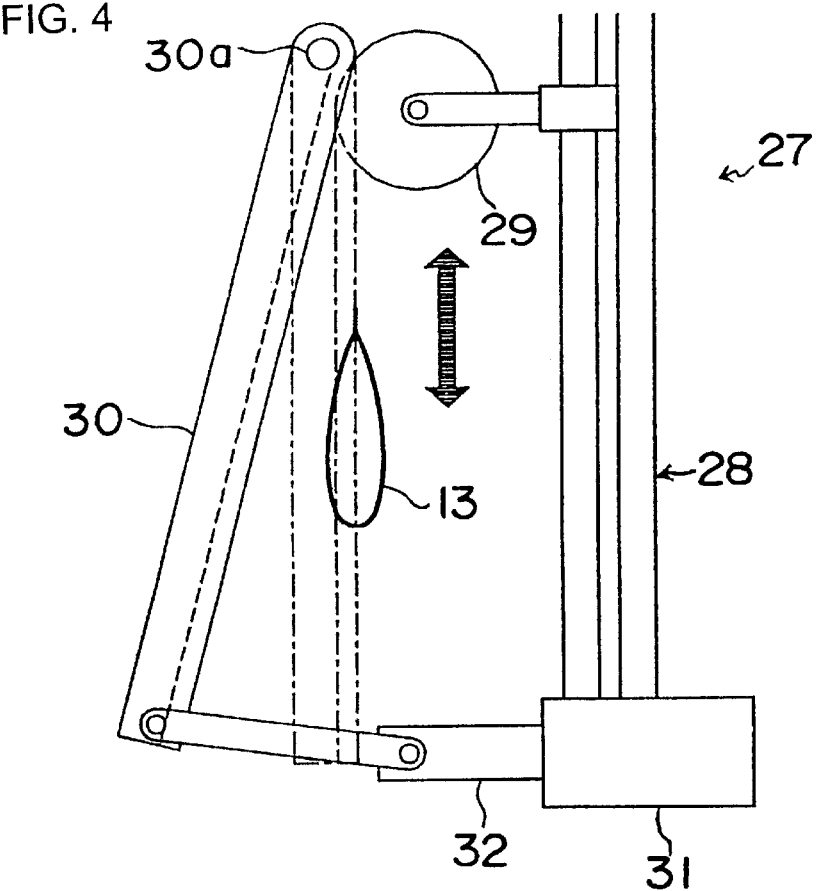
FIG. 4 is a front view showing the cutter part of the tablet dispensing station of FIG. 3.

The cutter part 27, as shown in FIG. 4, comprises a circular cutter 29 provided so as to be movable up and down along a guide shaft 28, and a pivotal cutter guide 30 which has a guide recess for guiding the peripheral cutting edge of the cutter 29 and which is pivotal about a pivot 30a provided at an upper end. A rod 32 of a solenoid 31 is coupled to a lower end portion of the cutter guide 30 so that the cutter guide 30 can be put into adjacency to the package belt 13, facilitating cutting by the cutter 29.

The package-belt bundling section 16 is provided to bundle and bind the package belt 13 cut by the cutter 29. To this package-belt bundling section 16, the package belt 13 is fed via a direction changing part 33 and a conveyor 34.

Figure 5:
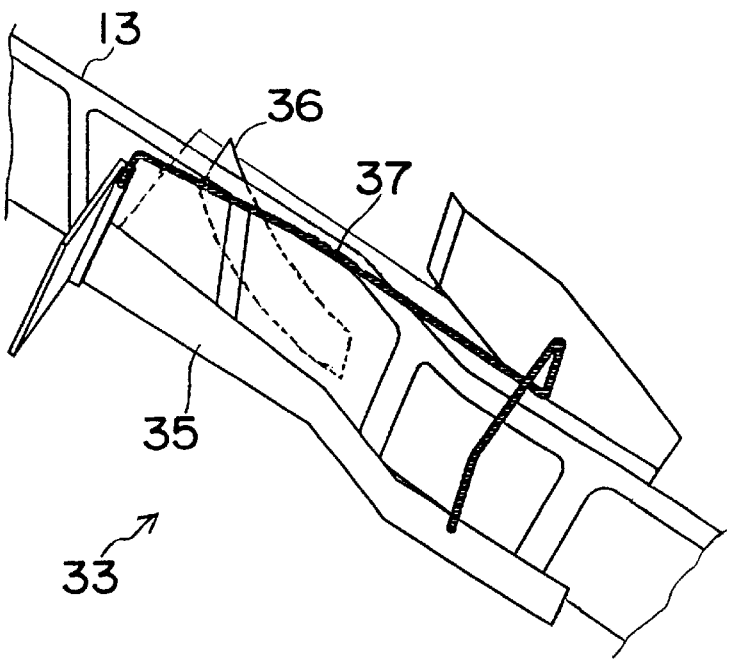
FIG. 5 is a perspective view showing the direction changing part of the tablet dispensing station of FIG. 3.

The direction changing part 33, as shown in FIG. 5, is provided to turn the cut package belt 13 approximately 90 degrees (from generally vertical to generally horizontal) while conveying the package belt 13 in a left to right direction in FIG. 5. This direction changing part 33 comprises a guide member 35 for guiding the package belt 13, a guide plate 36 for guiding the lower edge of the package belt 13 to the guide member 35, and a wire 37 for gradually holding the upper edge of the package belt 13 to tilt package belt 13 sideways.

Figure 6:
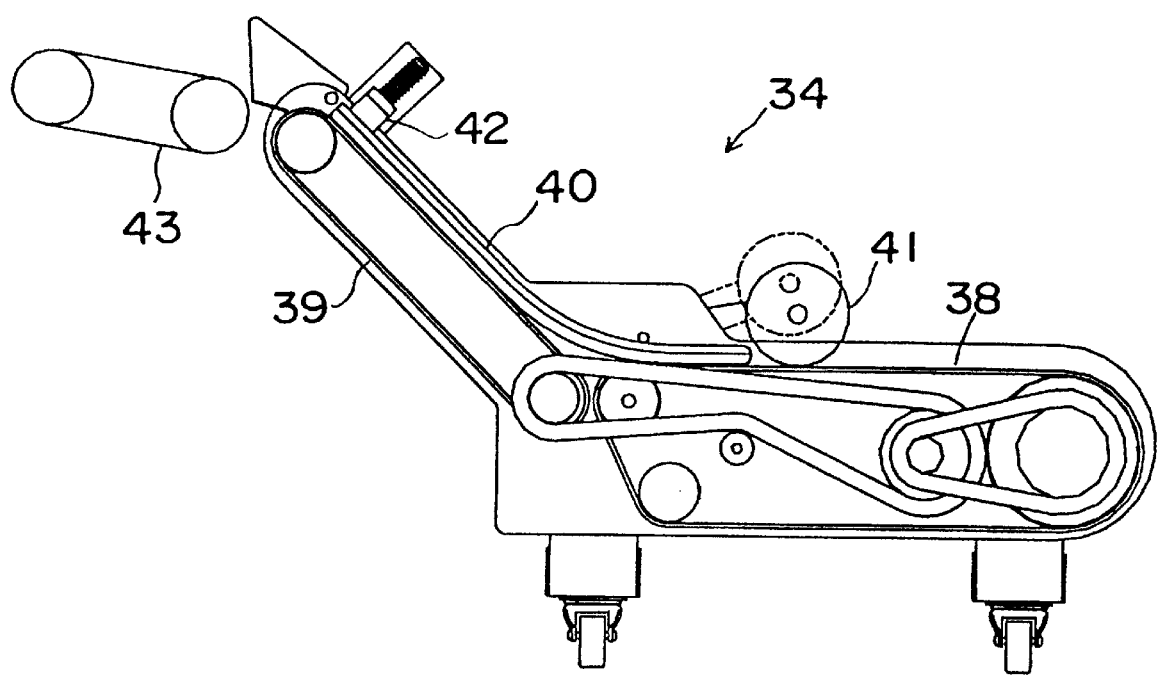
FIG. 6 is a front sectional view showing the conveyor of the tablet dispensing station of FIG. 3.

The conveyor 34, as shown in FIG. 6, is enabled to convey the package belt 13 obliquely upward by a horizontal conveyor belt 38 and a sloped conveyor belt 39. A tension sheet 40 is disposed above part of the horizontal conveyor belt 38 and the sloped conveyor belt 39. This tension sheet 40 is formed of a flexible material having small frictional resistance. A sponge roller 41 is pivotally-mounted on the entrance side of an insertion passage defined by the belt 38 and the tension sheet 40. The belt 38 is set to a conveyance speed higher than that in the direction changing part 33. If an unreasonable tensile force should act upon the package belt 13, an unshown limit switch is turned off by the swinging movement of the sponge roller 41 so that the driving of the belt 38 is stopped. Meanwhile, on the exit side of the insertion passage, a presser member 42 biased by a spring is provided, biasing the tension sheet 40 toward the belt 39. As a result, the package belt 13 is pressed against the belt 38 with the frictional resistance increased, so that the package belt 13 can be prevented from clogging on the exit side. In addition, reference numeral 43 denotes a delivery belt to deliver package belt 13 to the package-belt bundling section 16.

Figure 7:
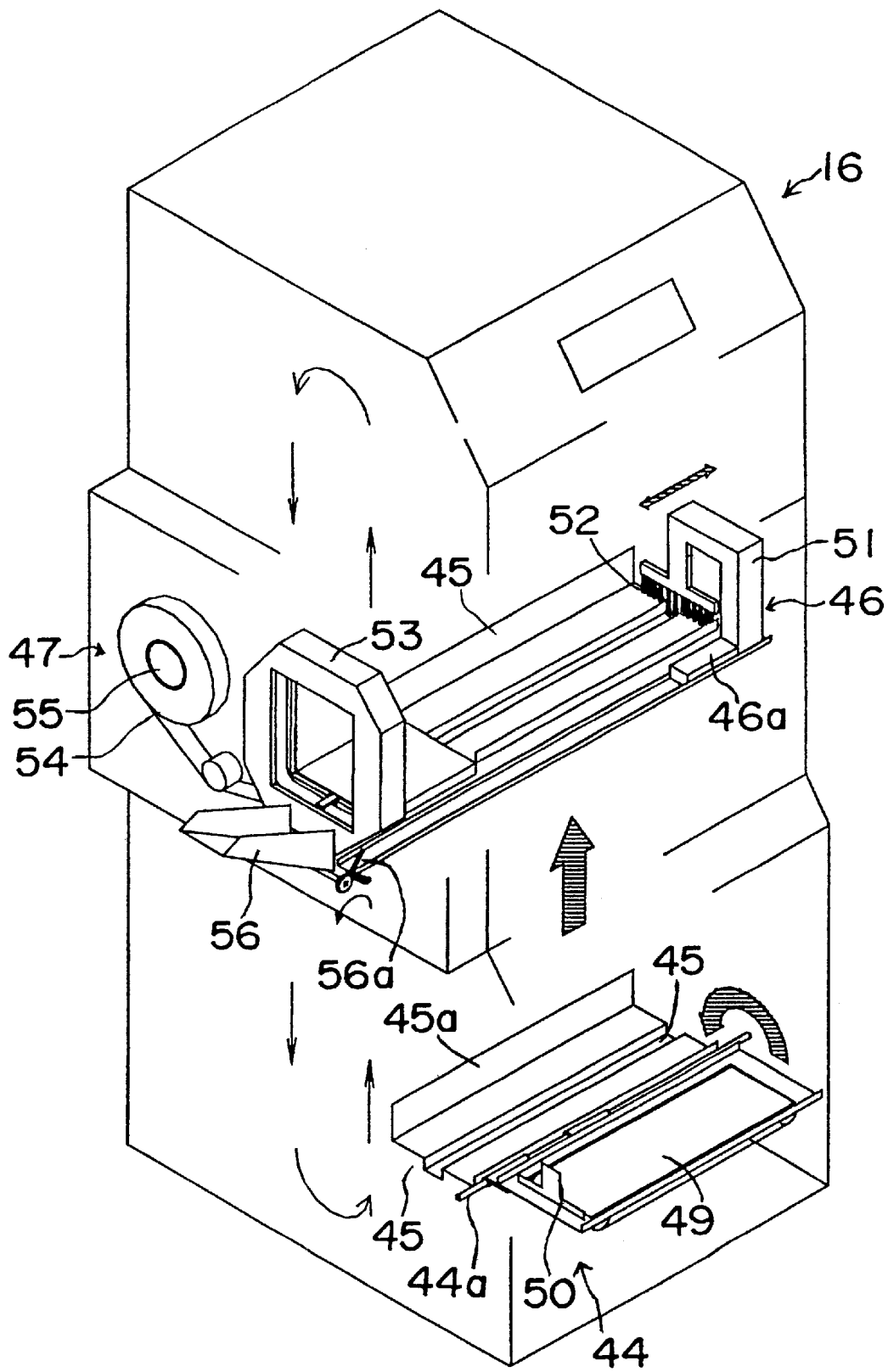
FIG. 7 is a perspective view showing the package-belt bundling section shown in FIG. 1.
Figure 8:
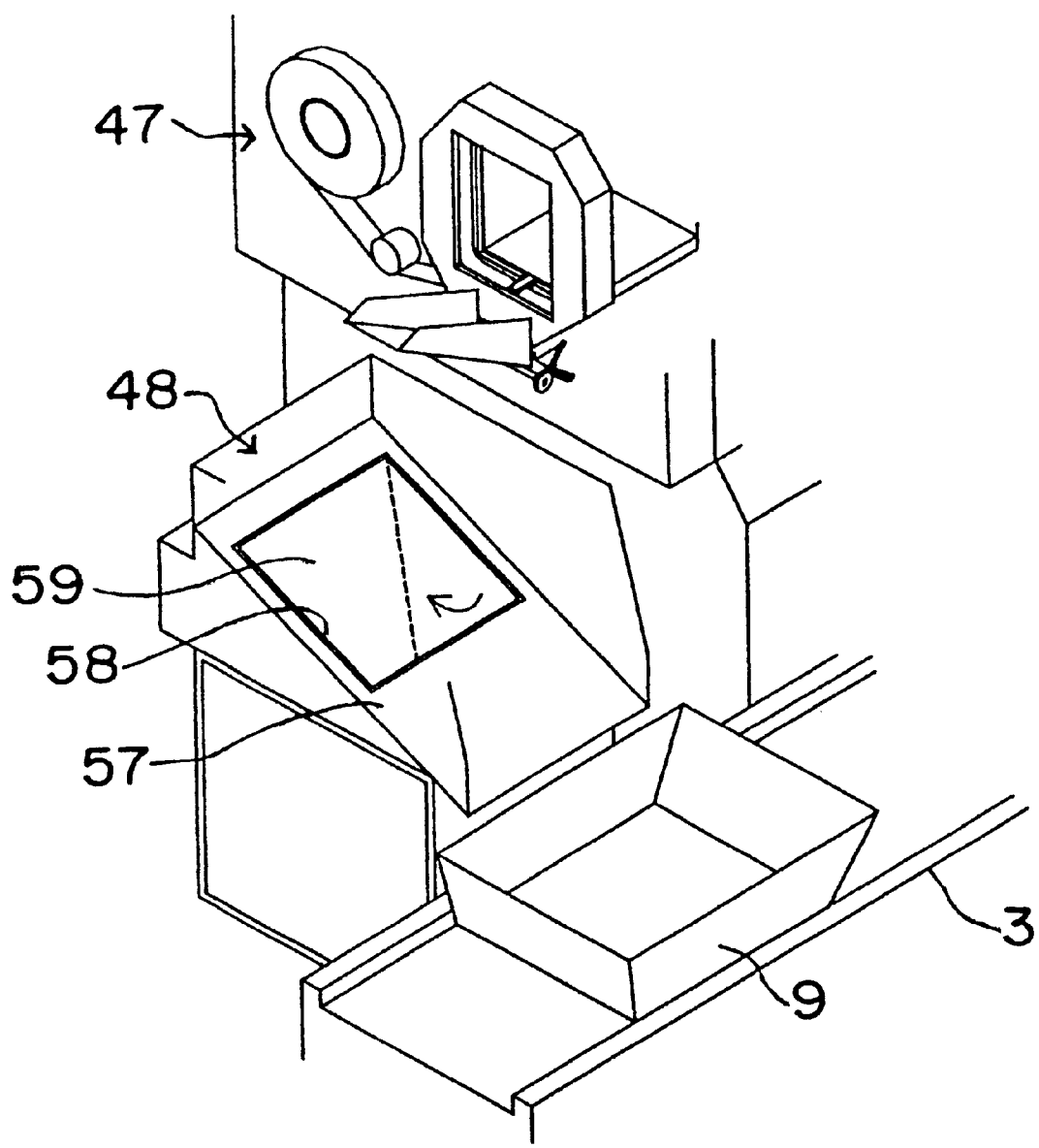
FIG. 8 is a perspective view showing the distributing member of the package-belt bundling section of FIG. 7.

The package-belt bundling section 16, as shown in FIGS. 7 and 8, comprises an inverting member 44, a lifter 45, a feed-in member 46, a bundling machine 47 and a distributing member 48.

The inverting member 44 is supported so as to be reciprocally pivotal over a range of approximately 180 degrees about a support shaft 44a. This inverting member 44 comprises a pull-in conveyor 49 for pulling in the package belt 13 from the delivery belt 43. A stopper 50 for positioning the conveyed-in package belt 13 is protrusively provided at an end portion of the pull-in conveyor 49. A sensor (not shown) is provided in proximity to the stopper 50 so that the presence or absence of the package belt 13 can be detected.

The lifter 45 is plate-shaped and has a side wall 45a extending along both side edge portions, and a recess 45b extending longitudinally in a central portion. The lifter 45 is reciprocally moved between a lower position where the package belt 13 is inverted by the inverting member 44 and can be loaded, and an upper position where the package belt 13 can be conveyed to the bundling machine 47 by the feed-in member 46.

The feed-in member 46 has a brush 52 provided at an end of a feed-in arm 51 that reciprocally moves along the side portion 45a of the lifter 45 located in the upper position.

The bundling machine 47 comprises a looped rectangular frame body 53, and a roller 55 on which bundling tape 54 is wound, where the central part of the stacked package belt 13 can be bundled with the tape 54 unwound from the roller 55. A chute 56 is provided in proximity to the bundling machine 47 along which the package belt 13 is discharged. This chute 56 has a tip end directed obliquely upward prior to discharge of the package belt 13. A presser 46a of the feed-in member 46, presses a lever 56a, by which the chute 56 is pivoted and directed obliquely downward to discharge the package belt 13.

Figure 9:
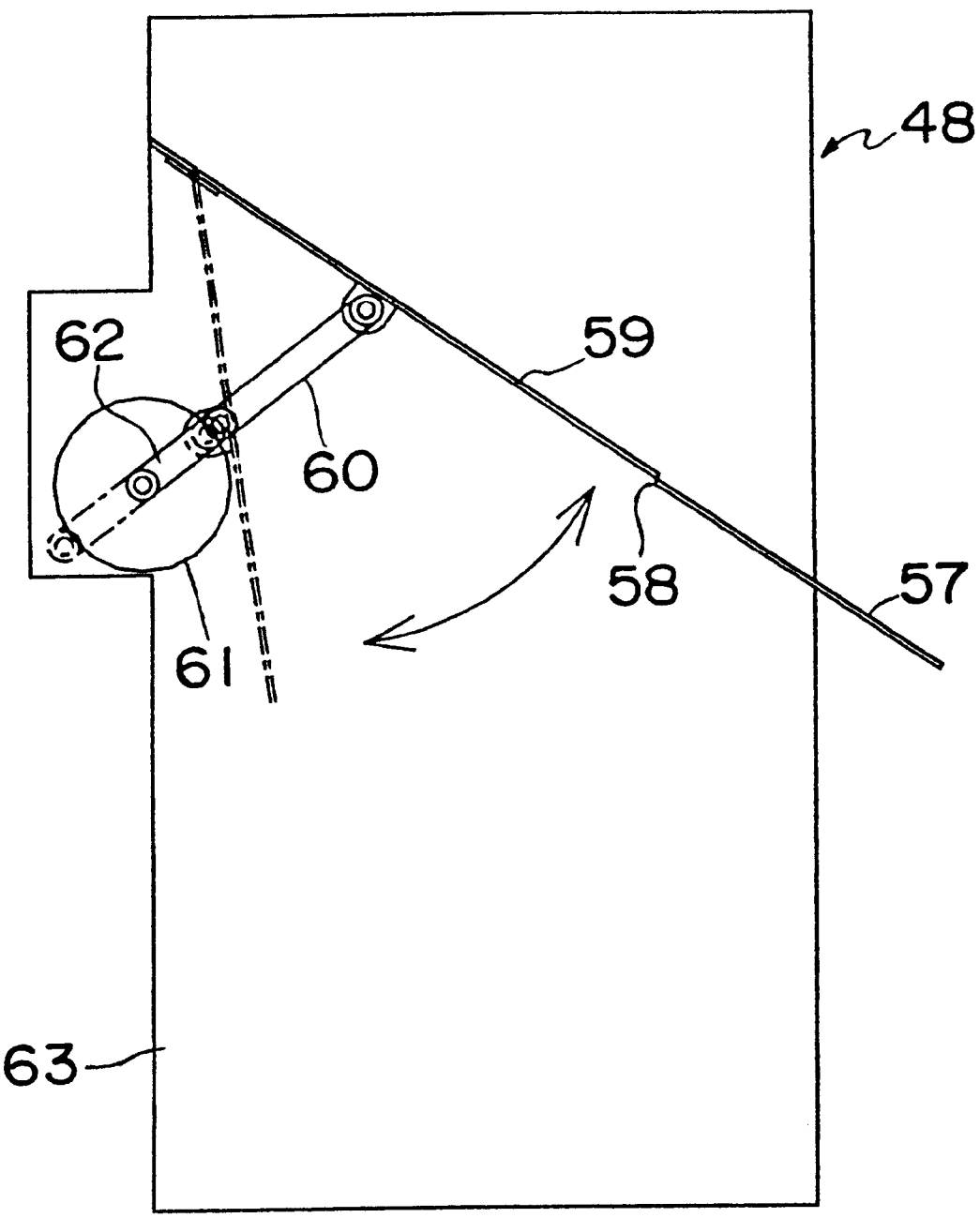
FIG. 9 is a side sectional view of the distributing member of the package-belt bundling section of FIG. 8.

The distributing member 48, as shown in FIG. 8, has an opening 58 formed in a sloped plate 57 directed obliquely downward, and this opening 58 is opened and closed by a distributing plate 59. A lower end edge of the sloped plate 57 extends to the conveyor line 3, allowing the bundled package belt 13 to be accommodated in the tray 9. Also, a first link 60 is pivotally coupled at its one end portion to the distributing plate 59 as shown in FIG. 9. A second link 62 provided on the rotating shaft of a motor 61 is pivotally coupled to the other end portion of the first link 60. The motor 61 is so designed as to stop after every 180 degree rotation. As a result of this, the distributing plate 59 is pivotal between one position where the distributing plate 59 is aligned with the sloped plate 57 with the lower edge slightly out of alignment with the top surface, and another position where the distributing plate 59 is positioned generally vertical. Also, a dust box 63 is disposed below the opening 58 of the sloped plate 57, so as to collect unnecessary portions (empty packages) of the package belt 13.

Array Ampule Dispensing Station

Figure 10:
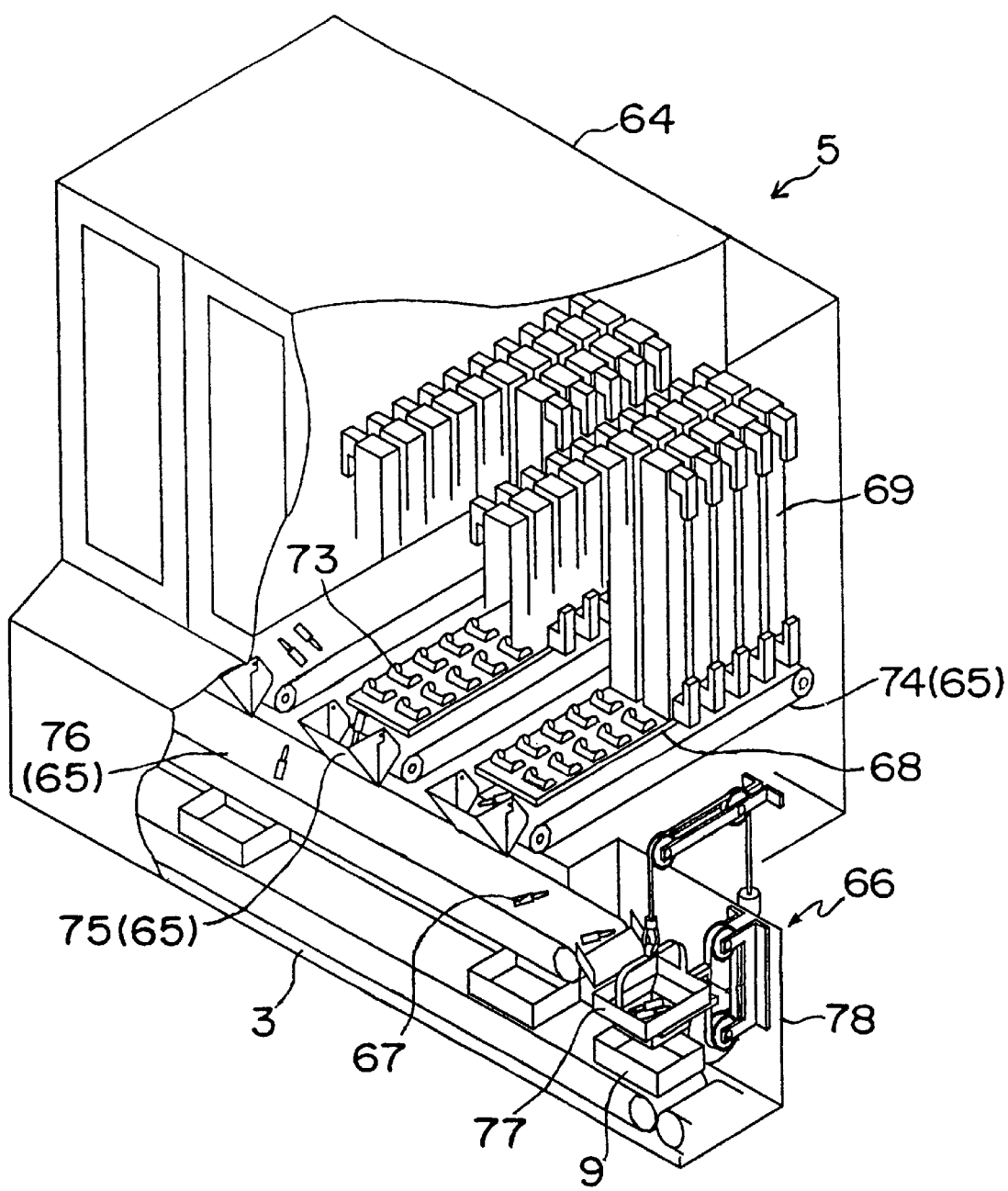
FIG. 10 is a partly broken perspective view showing the array ampule dispensing station of FIG. 1.

The array ampule dispensing station 5, as shown in FIG. 10, comprises an ampule bulk storage section 64, an ampule conveying section 65 and an ampule dispensing section 66, and is used mainly to dispense ampules 67 each having a large capacity as much as 10 to 30 ml (for more details, see Japanese Patent Laid-Open Publication HEI 7-267370).

Figure 11A:
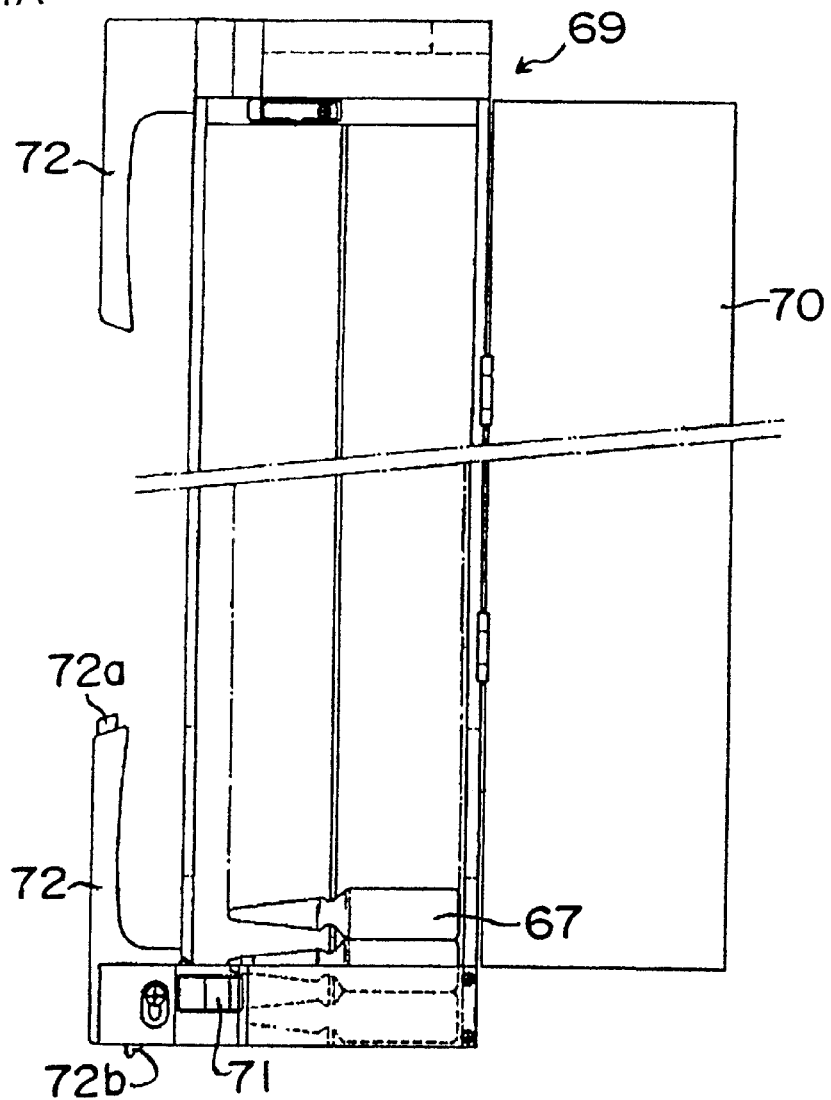
FIG. 11A is a front sectional view showing the ampule cassette of FIG. 10.
Figure 11B:
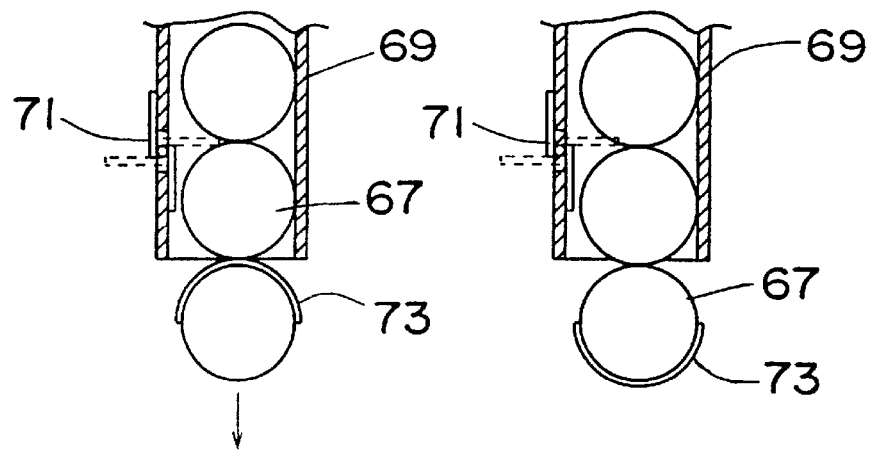
FIG. 11B is a partial sectional view showing an ampule discharging state including a stop provided in a lowermost portion of the ampule cassette.
Figure 11C:
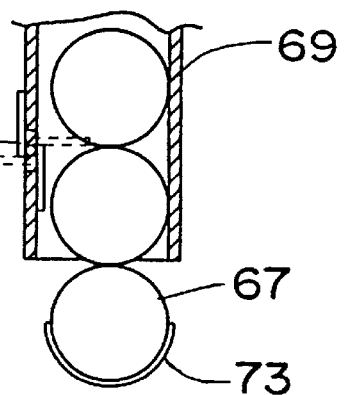
FIG. 11C is a partial sectional view showing an ampule-holding state including the stop.

In the ampule storage section 64, a plurality of drawer cradles 68 are provided in array. In each drawer cradle 68, a plurality of ampule cassettes 69 are provided in array. Each ampule cassette 69, as shown in FIG. 11A, is shaped into a box having an openable/closable door 70 provided on one side face. Inside the cassette 69, the ampules 67 are stored in a laterally-postured and arrayed state. Also, as shown in FIGS. 1B and 11C, the lower face of the ampule cassette 69 is opened and a stop 71 is provided at the opening so as to prevent the ampules 67 from falling out. When the ampule cassette 69 is set up, only the lowermost-positioned ampule 67 can be discharged in a downward direction by withdrawing stop 71. Further, handles 72, each protruding in a generally L shape are formed above and below on one side face of the ampule cassette 69 perpendicular to the door 70. A detent actuator portion 72a is formed in the lower handle 72, so that an engaging detent 72b provided at the lower end surface of the ampule cassette 69 can be operated to extend and retract. By this engaging detent, the ampule cassette 69 can be attached to the drawer cradle 68. The drawer cradle 68 is equipped with discharge rotors 73, and the ampules 67 within the ampule cassette 69 can be discharged one by one by the discharge rotor 73 pivoting between the states of FIGS. 11B and 11A. In addition, an insertion hole (not shown) intended for a sensor is bored in the lower-end side surface of the ampule cassette 69, making it possible to determine whether the remaining stock of ampules 67 has been decreased or has been depleted.

The ampule conveying section 65 comprises a first conveyor belt 74 disposed below the drawer cradle 68, a stock storage 75 provided at the conveyance end of the first conveyor belt 74, and a second conveyor belt 76 disposed below the stock storage 75 generally perpendicular to the first conveyor belt 74.

The ampule dispensing section 66 comprises a stock container 77 for storing conveyed ampules 67, and an up-down member 78 for discharging the ampules 67 stored in container 77 to the tray 9 on the conveyor line 3 while suppressing any impact force acting on the ampules 67.

Random Ampule Dispensing Station

Figure 12:
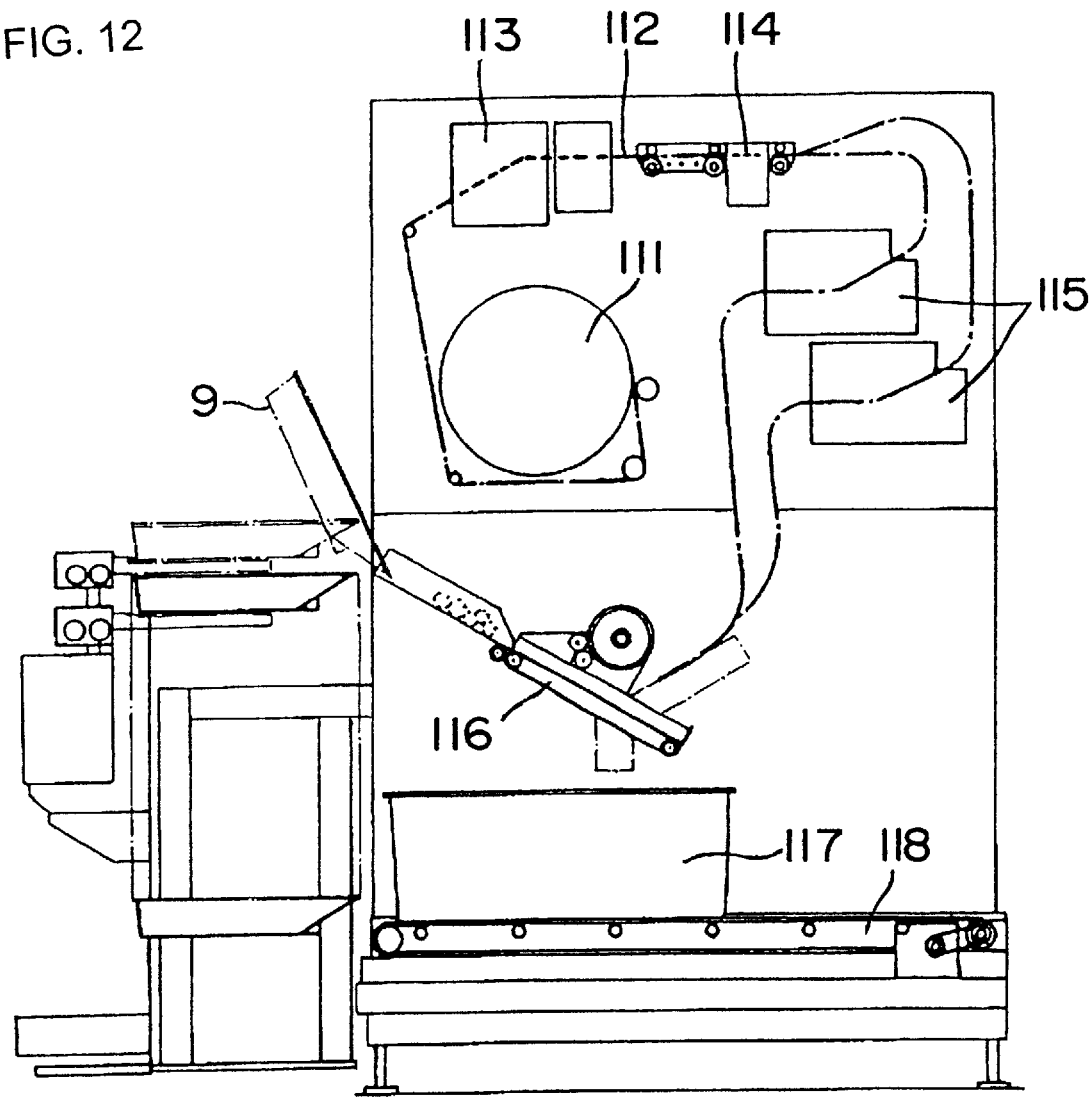
FIG. 12 is a partly broken perspective view showing the random ampule dispensing station.

The random ampule dispensing station 6, as shown in FIG. 12, comprises a drum-shaped rotary storage rack 79, and a lifter part 80 which goes up and down in the center of the rotary storage rack 79, and is used to dispense mainly small-capacity ampules 81 (FIG. 13) with a capacity less than 10 ml (for more details, see Japanese Patent Applications HEI 10-149489, HEI 10-99001, HEI 9-142473, HEI 9-212102, etc.)

Figure 13A:
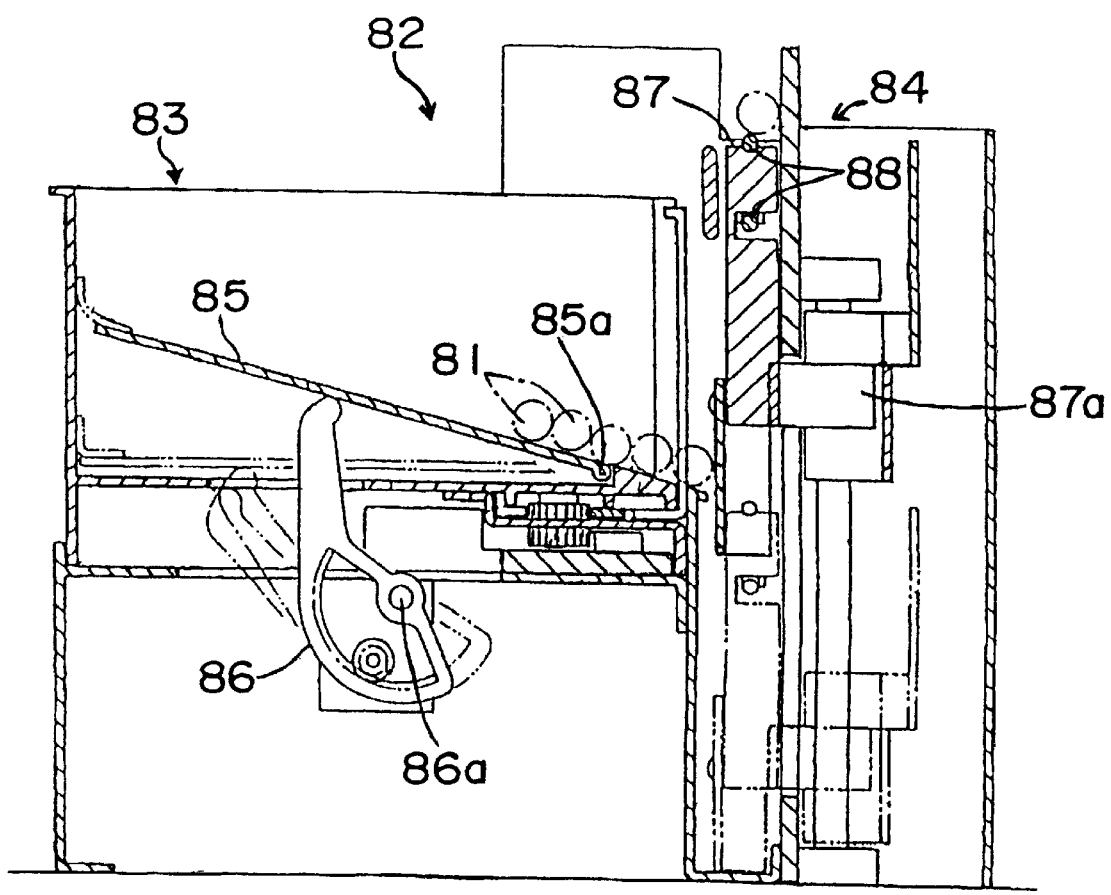
FIG. 13A is a front sectional view showing the ampule container of FIG. 12.
Figure 13B:
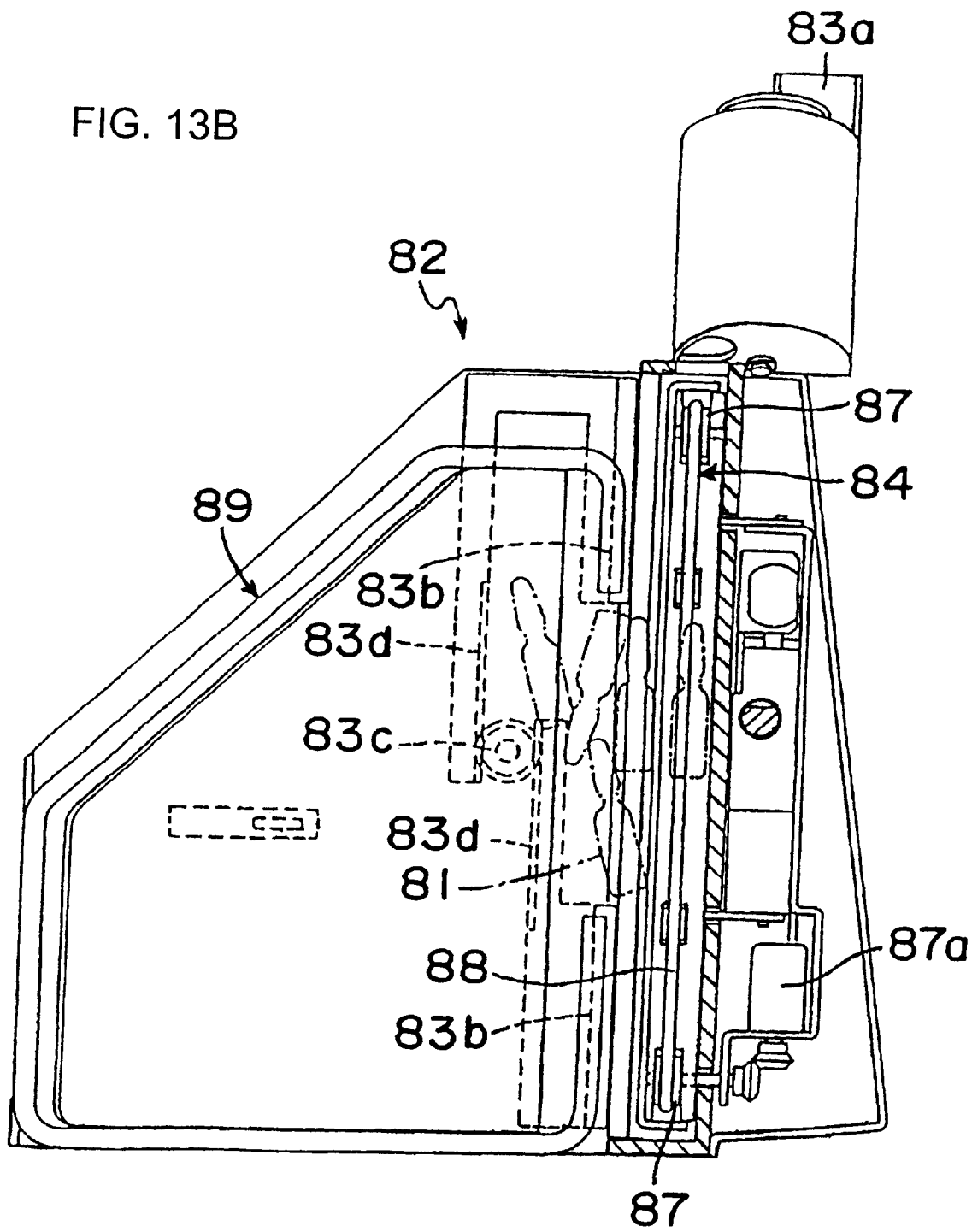
FIG. 13B is a top sectional view showing the ampule container of FIG. 12.

In the rotary storage rack 79, a plurality of ampule containers 82 are disposed vertically and circumferentially in so that an up-and-down space for the lifter part 80 10 can be obtained on the central side. Each ampule container 82, as shown in FIGS. 13A and 13B, comprises an ampule storage chamber 83 and an ampule array-and-conveyance section 84. The ampules are bulk-stored within storage chamber 83 prior to dispensing. Different types of medications can be dispensed in the form of ampules 81 giving the operator flexibility in filling prescriptions.

A bottom wall 85 of the ampule storage chamber 83 is pivotal about a pivot 85a, and will be inclined by rotation of a rotating arm 86 so that the ampules 81 can be moved to the ampule array-and-conveyance section 84. Also, in the ampule array-and-conveyance section 84, a belt 88 is stretched between pulleys 87 so that the ampules 81 placed on the belt 88 can be conveyed by one pulley 87 being rotated by the drive of a motor 87*a*. The ampule array-and-conveyance section 84 can be moved up and down by the drive of a motor, between a lower position where the ampules 81 within the ampule storage chamber 83 can be loaded on, and an upper position where the ampules 81 can be discharged to the lifter part 80 via a chute 83*a*. In addition, the ampule storage chamber 83 and the ampule array-and-conveyance section 84 are partitioned from each other by a shutter 83*b*, which is opened and closed with a pinion 83*c* and a rack 83*d*.

Figure 14:
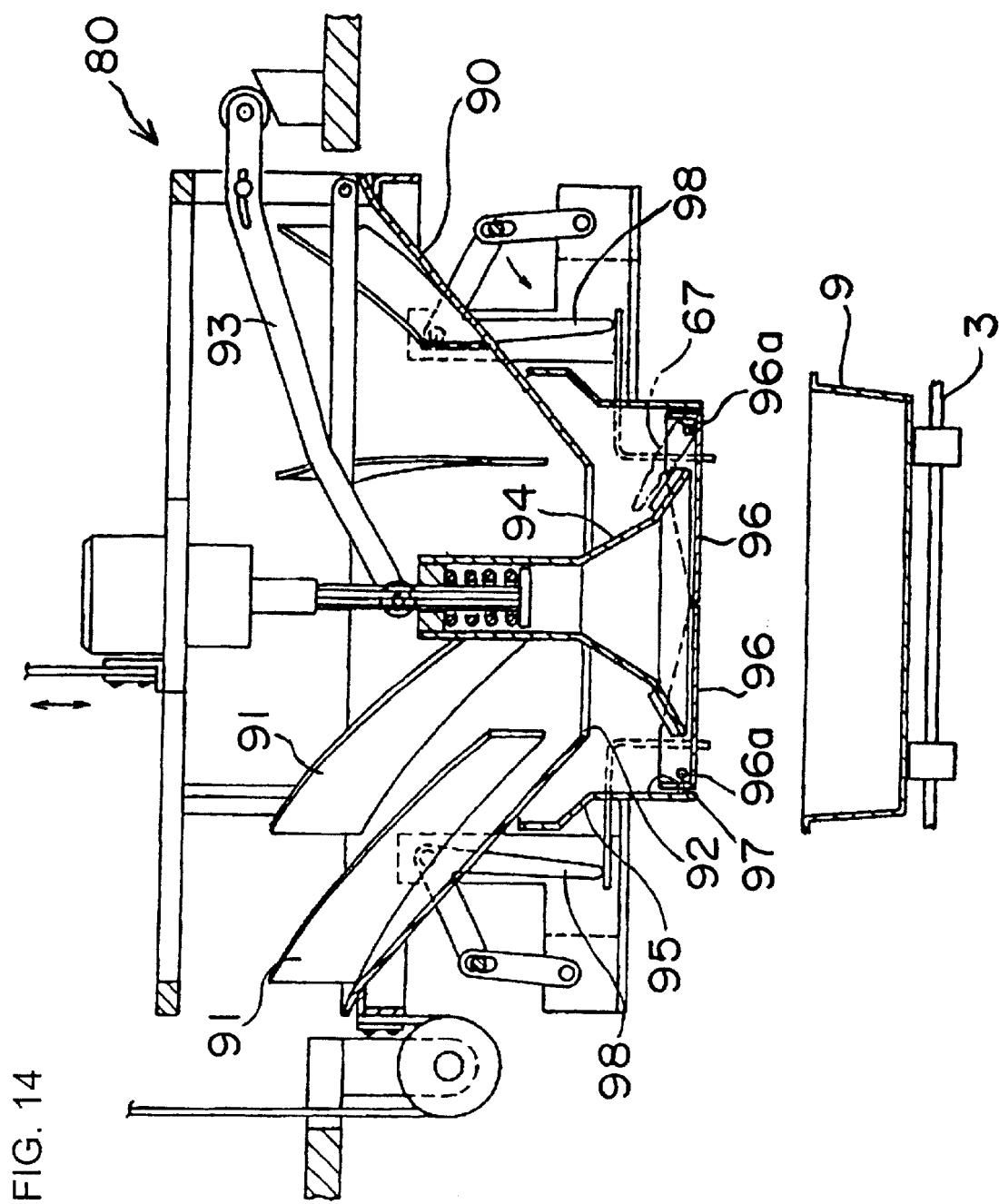
FIG. 14 is a sectional view showing the lifter part of FIG. 12.

In the lifter part 80, as shown in FIGS. 12 and 14, a lifter container 90 is moved up and down along three rails 89 provided vertically in a center-side space of the rotary storage rack 79 (for more details, see Japanese Patent Application HEI 9-3071530) The lifter container 90 is funnel-shaped and has spiral guide blades 91 formed therein. The lifter container 90 is rotated by an unshown motor and guide blades 91 direct an ampule 67 to a central opening 92 under the guide by the guide blades 91. The opening 92 is opened and closed by an opening/closing valve 94 that is moved up and down with an opening/closing arm 93.

Figure 15A:
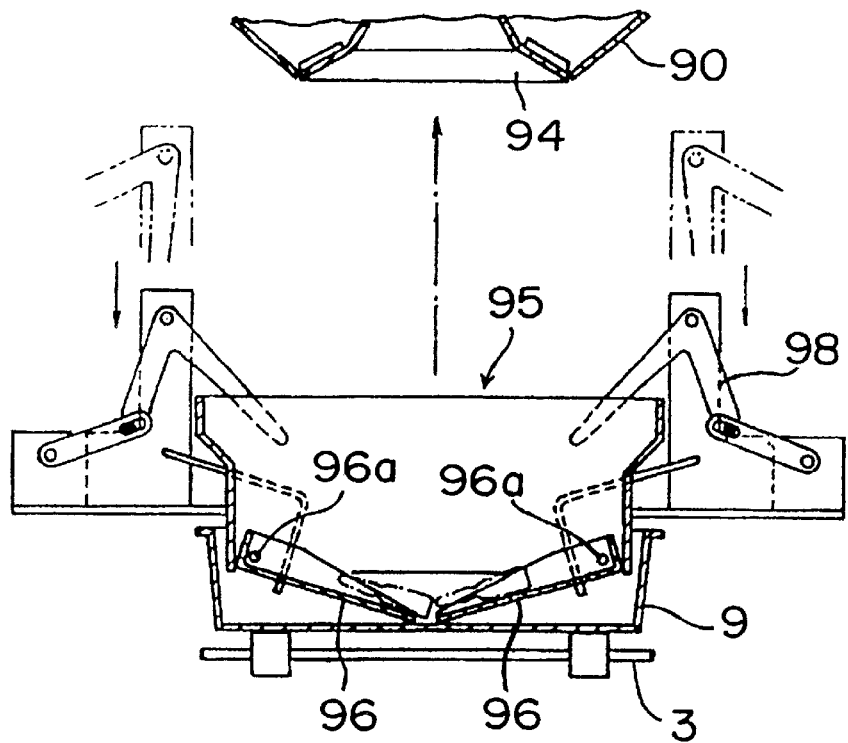
FIG. 15A is a sectional view showing the lifter container of the lifter part of FIG. 14 with its bottom plates released from the closed state.
Figure 15B:
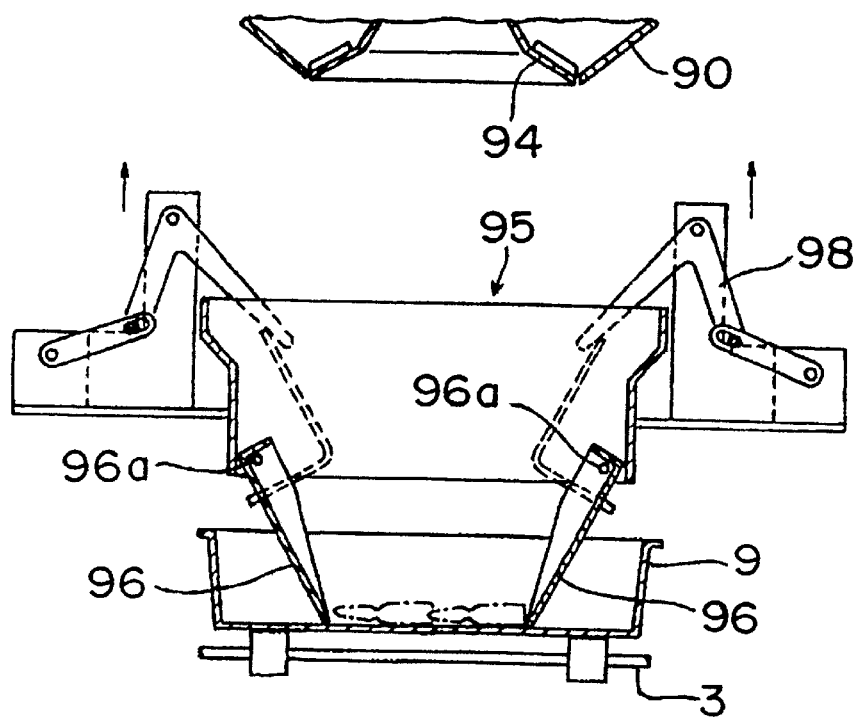
FIG. 15B is a sectional view showing a state in which the lifter container has been elevated from the position shown in FIG. 15A.

A delivery stock storage device 95 is provided below the lifter container 90. As shown in FIG. 15A, device 95 includes pivotally-mounted bottom plates 96. Each bottom plate 96 is pivotal about a pivot 96*a* to form an opening 97 in the bottom of device 95 when in the position shown in FIG. 15B. The bottom plates 96, as shown in FIG. 14, receive the ampules 6–7 from the lifter container 90, and keep the bottom-face opening 97 closed by links 98 until the bottom plates 96 are located above and near the tray 9. Then, when the bottom plates 96 are located above and near the tray 9, the bottom plates 96 are released from the closed state by the links 98, as shown in FIG. 15A. As a result, when the lifter container 90 is moved up relative to the tray 9, the bottom plates 96 pivot while keeping their free end portions in contact with the top face of the tray 9, gradually opening the opening 97 as shown in FIG. 15B. Accordingly, the ampules 67 discharged from the lifter container 90 are smoothly moved into the tray 9 without undergoing any impact force.

Label Issuing Station

Figure 16:
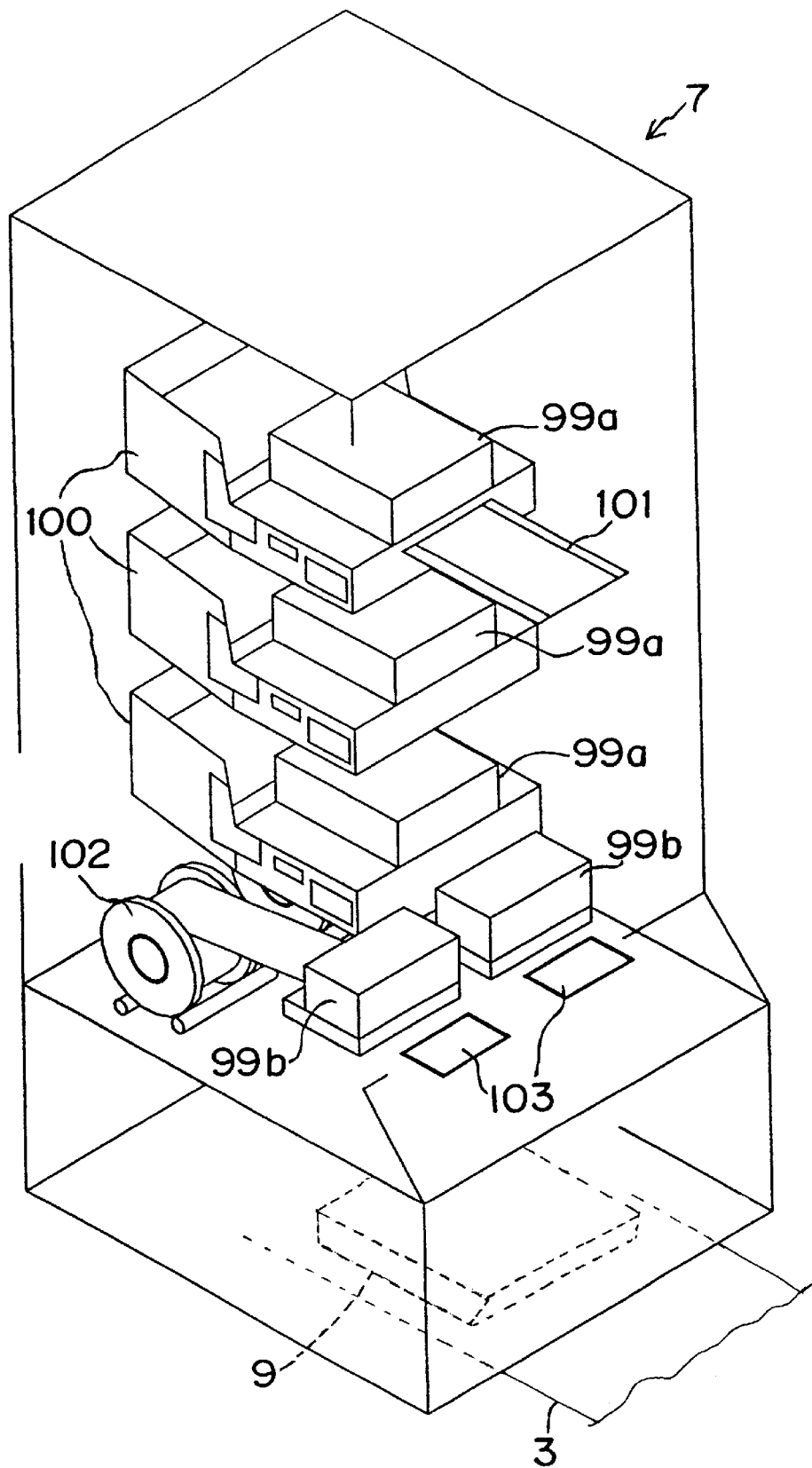
FIG. 16 is a schematic perspective view showing the label issuing station of FIG. 1.

The label issuing station 7 has a plurality of printers 99*a*, 99*b* arranged vertically as shown in FIG. 16, and the uppermost three printers 99*a* are fed with prescription paper 101 from stock store 100, respectively. This prescription paper 101 is provided so that a pharmacist may verify that the correct medication was dispensed. Also, the two printers 99*b* (shown juxtaposed below printers 99*a*) are each fed with labels, such as laber 103, wound around a roll 102. This label 103 is affixed to the ampules 67, storage containers or the like, and is used to indicate their contents. Machine-readable information, such as bar code information, is printed on paper 101 and labels 103 as described elsewhere in the application.

Tray Recovering Station

Figure 17:
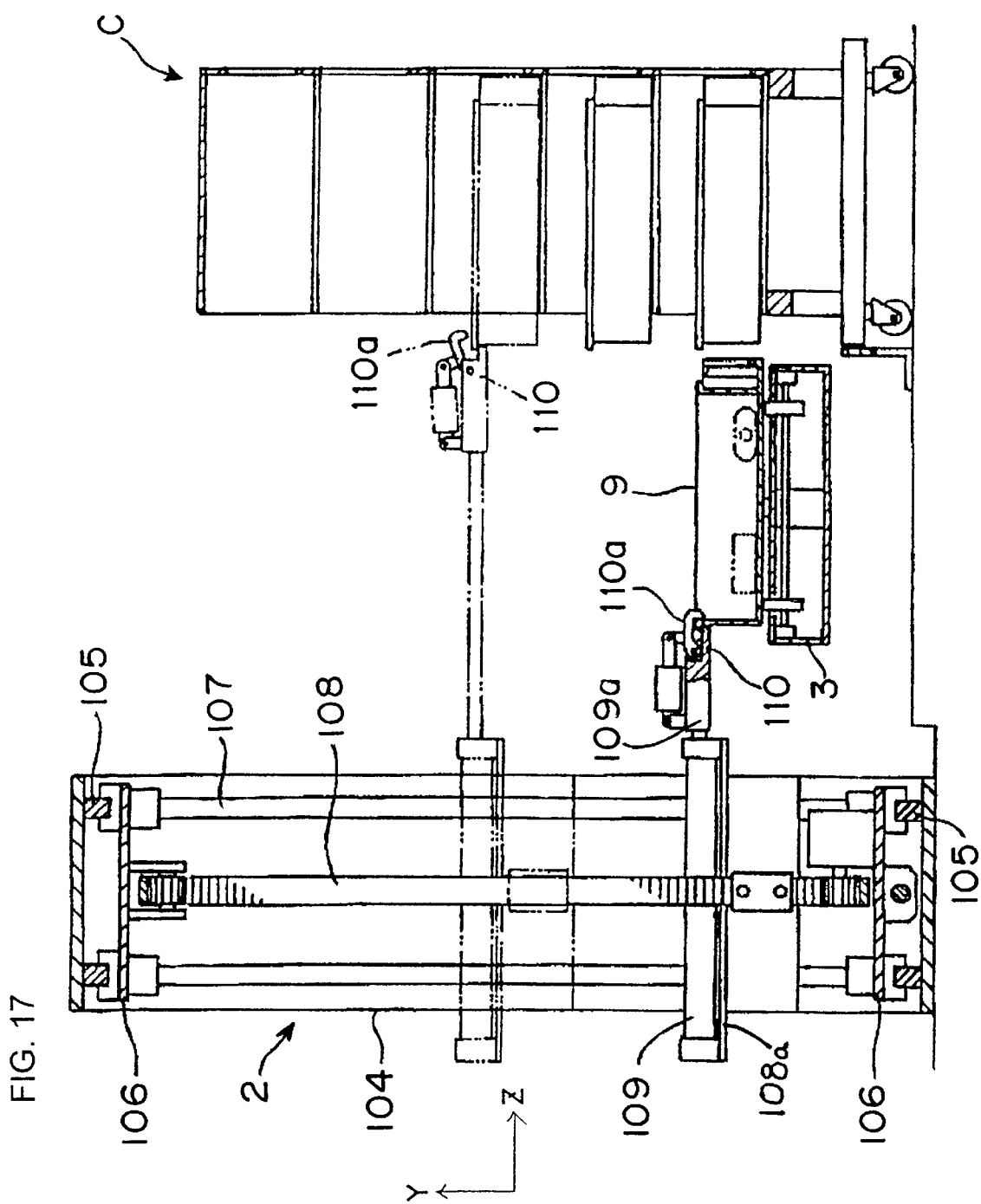
FIG. 17 is a sectional view showing the tray recovering station of FIG. 1.

In the tray recovering station 2, as shown in FIG. 17, a support base 106 is provided on rails 105 placed above and below in a support main frame 104 so that the support base 106 is reciprocally movable along an X-axis direction parallel to the conveyor line 3. The support base 106 is equipped with guide rails 107 extending vertically. Base 108*a* movable up and down along guide rails 107 in a vertical Y-axis direction by a belt chain 108. Base 108*a* is equipped with a cylinder 109. Rod 109*a* of the cylinder 109 is equipped with a gripping arm 110, which goes back and forth along a Z-axis direction perpendicular to the conveyor line 3. The gripping arm 110 has at its front end a claw portion 10*a* formed for gripping a peripheral portion of the tray 9 (see also Japanese Patent Laid-Open Publication HE 9-51922 etc.).

System Operation

Next, operation of the exemplary medication collecting system constructed as described above is explained.

When patient prescription information is read, a tray 9 is fed out from the tray feed station 1 to the conveyor line 3. The tray 9 fed out to the conveyor line 3 is first conveyed to the tablet dispensing station 4. If the patient's prescription information does not include tablets 23, the tray 9 passes through the tablet dispensing station 4 without stopping. If tablet 23 information is included in the prescription, the tray 9 is stopped below the sloped plate 57 of the distributing member 48.

Tablet dispensing station 4 then dispenses tablets 23 in dosage units, such as one-day doses of medicaments. The tablets are fed from the relevant tablet cassette 20 in steps of one dose one after another according to the dosage time, and then are packed into medication packages formed in the package belt 13.

Figure 18A:
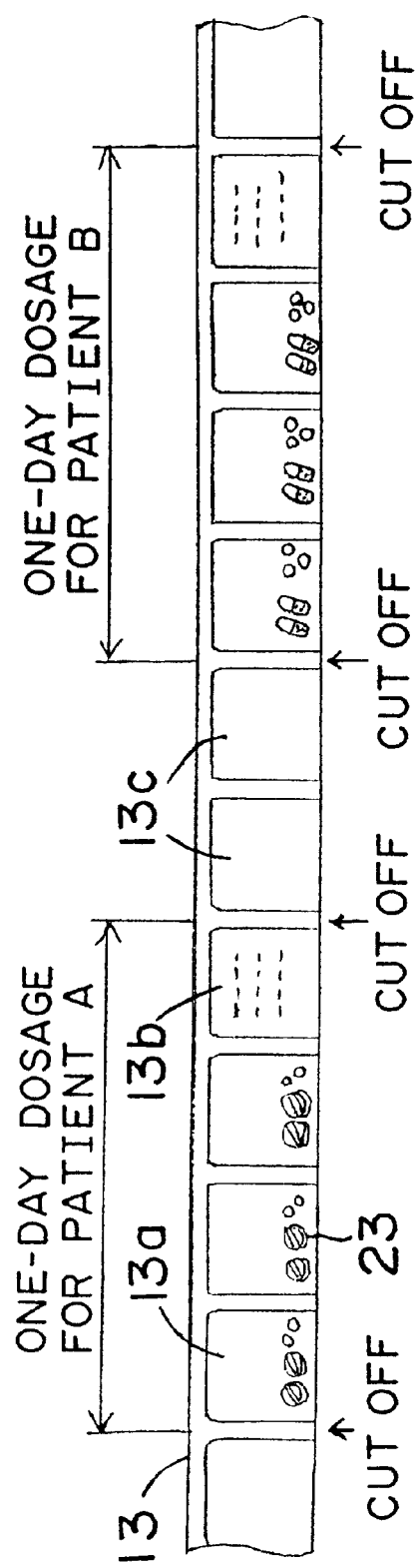
FIGS. 18A and 18B are front views showing examples of the package belt in which medicaments are packed.
Figure 18B:
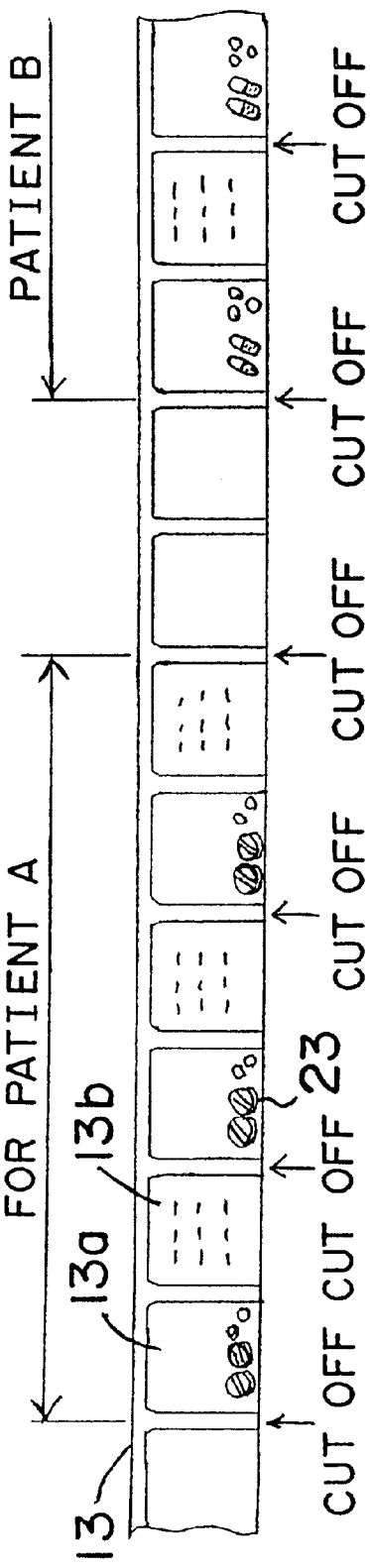

As for the form of package, if a one-day dosage includes a plurality of times, for example, morning, noon and evening, then medication packages 13*a* of the tablets 23 are continuously packaged as shown in FIG. 18A, or empty packages are formed between the medication packages 13*a* of the tablets 23 and the contents of the tablets 23. Dosage information and the like are printed on these empty packages to make printed portions 13*b* as shown in FIG. 18B. (Dosage information can also be printed on the packages containing tablets 23 as is the case in the package 13 shown in FIG. 23.) In the former case, as shown in FIG. 18A, the package belt is cut off by the cutter 29 with one-day doses taken as a unit. Thus, the need for bundling by the bundling machine 47 is eliminated. In the latter case, as shown in FIG. 18B, the package belt is cut off by the cutter 29 with one dose taken as a unit. In addition, with a different patient, two empty packages 13*c* are additionally formed between a printed portion 13*b* for patient A and a medication package portion 13*a* for the next patient B, thus enabling continuous processing. Further, the empty packages 13*c* are separated from the other portions by the cutter 29.

Subsequently, the cut package belt 13 is conveyed to the inverting member 44 via the direction changing part 33 and the conveyor 34, so as to be transferred to the lifter 45. For the package belt 13 or the empty packages 13*c* in the unit of one-day doses, the lifter 45 goes up without waiting for stacking by the transfer from the inverting member 44; for the package belt 13 in the unit of one dose, the lifter 45 will not go up until the one-day doses have been completely stacked by the transfer from the inverting member 44. Then, the cut package belt 13 is moved sideways by the feed-in member 46, where in the case of the package belt 13 or empty packages 13*c* in the unit of one-day doses, the cut package belt 13 is passed through as it is without being bundled by the bundling machine 47; in the case of the stacked package belt 13, the cut package belt 13 is once stopped at the bundling machine 47, where the cut package belt 13 is bundled and then fed to the tray 9 via the distributing member 48. In addition, in the distributing member 48, for processing's sake, when empty packages 13c are conveyed up, the empty packages 13c are discarded to the dust box 63 via the opening 58 by rotating the distributing plate 59.

Subsequently, the tray 9 is conveyed to the array ampule dispensing station 5, and further to the random ampule dispensing station 6. In this case also, based on the prescription information, the tray 9 is passed through as it is, or when ampules 67, 81 are fed, the tray 9 is stopped at a relevant unit.

After that, the tray 9 is conveyed to the label issuing station 7. In the label issuing station 7, the prescription paper 101 on which prescription information as to all the medicaments within the conveyed-up tray 9 has been printed, as well as a label 103 to be affixed to the surface to show the contents of the stored ampules 67, are fed into the tray 9.

Now that desired medicaments have been fed to the tray 9 in this way, this tray 9 is conveyed to the tray recovering station 2, where the medicaments are transferred onto shelves of a sorting cart (e.g., medication storage cabinet marketed by Pyxis Co.) C by the arm 110. In addition, this sorting cart C is movably set in the nurse station, and put into use for distribution to the patients in hospital when the time to administer the medication has arrived.

Medication Replenishment Operation

Whereas the dispensing of medication is carried out as described above, the medication collecting system can detect the absence of any tablets 23 and ampules 67, 81, and can perform appropriate replenishment by checking these medicaments.

For this purpose, the tablet dispensing station 4 and the ampule dispensing stations 5, 6 are equipped, although not shown, with a touch panel to be controlled by a controller, a wireless bar code reader with a recharging cradle therefor, and a scale.

Figure 19A:
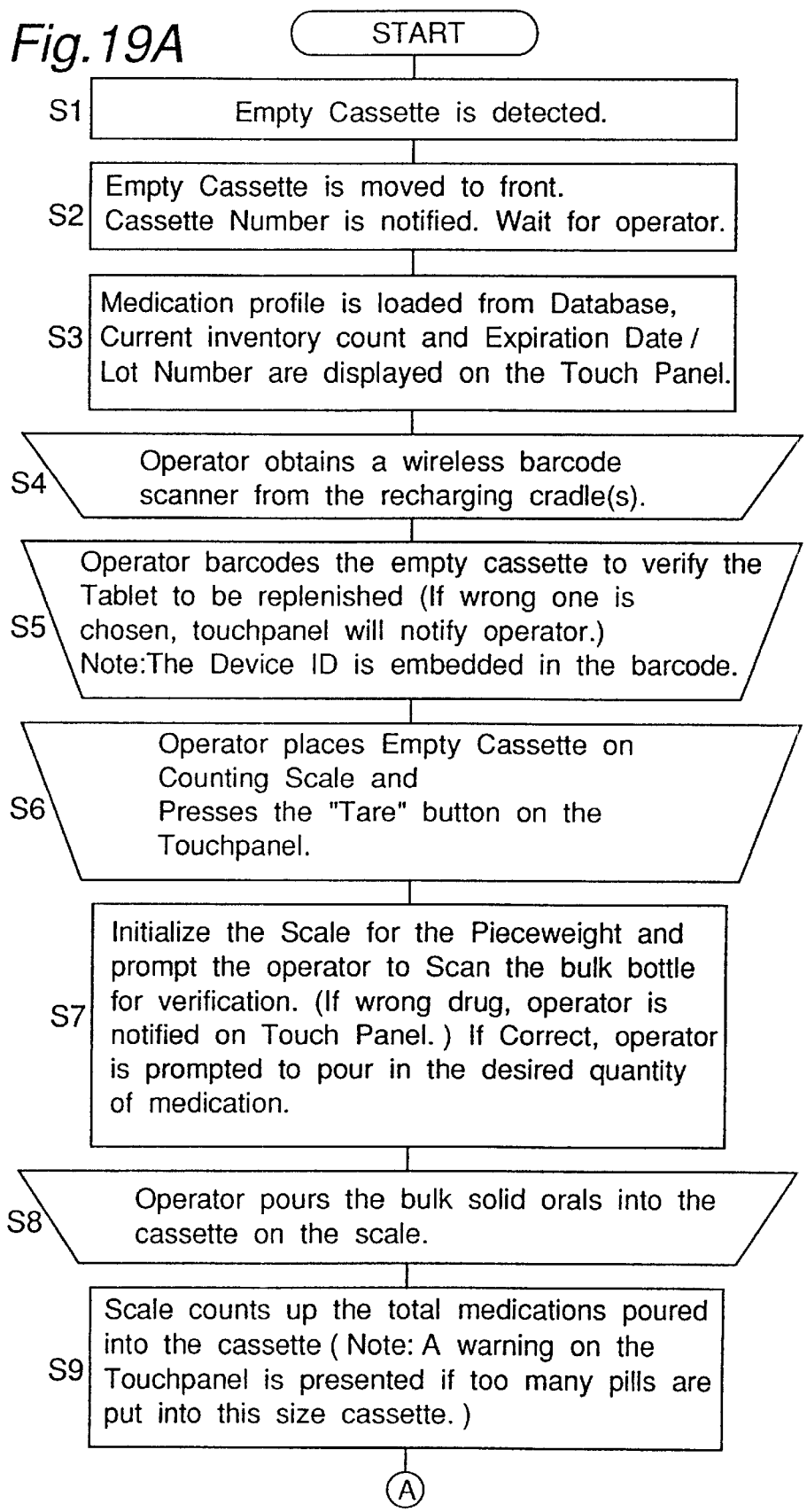
FIGS. 19A and 19B are flow charts showing the tablet replenishing work in the tablet dispensing station.
Figure 19B:
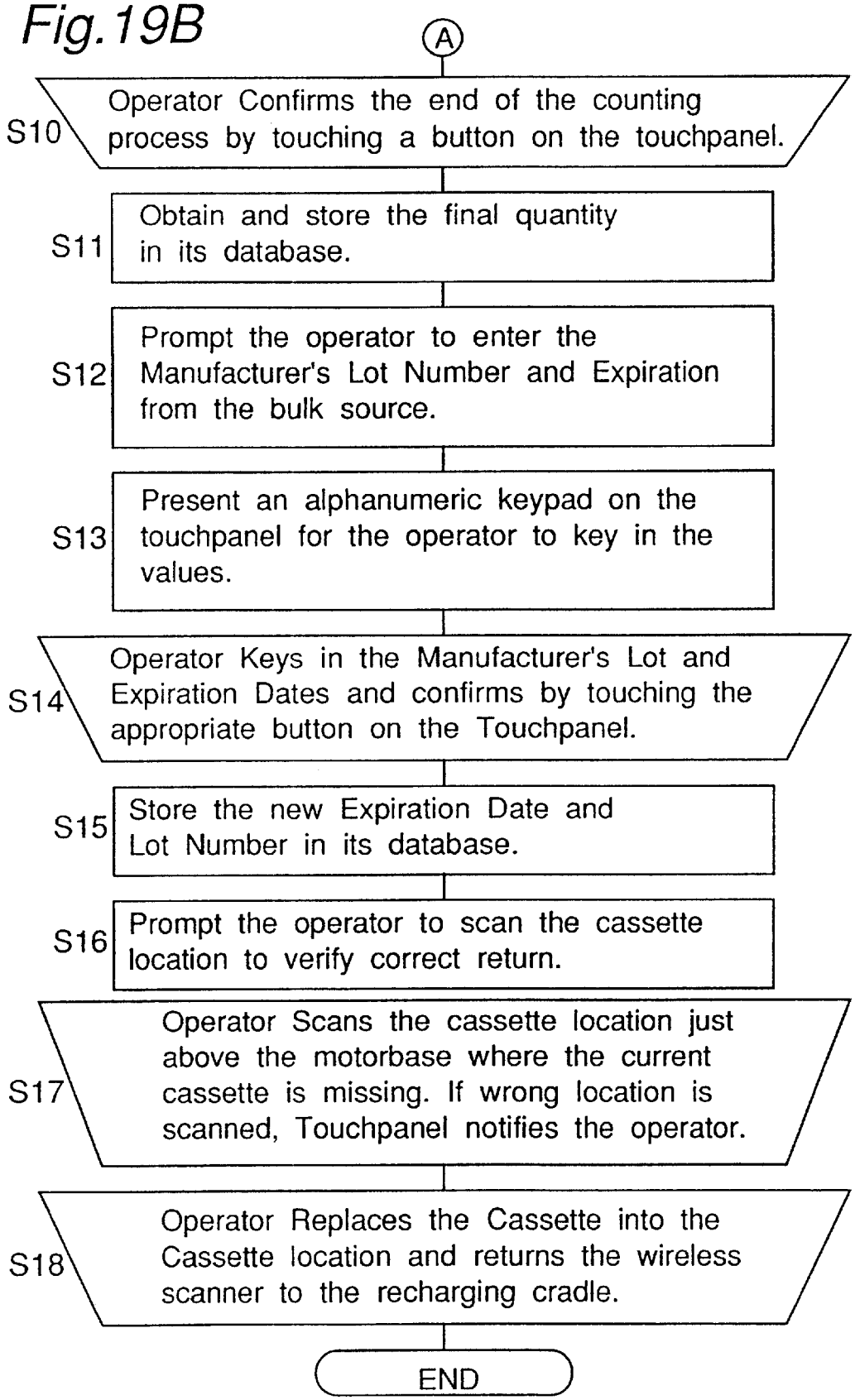

In the tablet dispensing station 4, the tablet cassettes 20 are exchanged according to the flow charts of FIGS. 19A and 19B. That is, when specified tablets 23 have come out of stock so that an empty tablet cassette 20 is detected (step S1), the cylindrical drum 18 is rotated so that the empty tablet cassette 20 is moved to an interchangeable position, where its cassette number is notified, followed by a standby state (step S2). Also, a relevant medication profile is loaded from the database, and the current inventory count and expiration dates/lot numbers are displayed on the touch panel (step S3). Then, the operator obtains a wireless bar code scanner (step S4), reads the bar code of this tablet cassette 20, verifying tablets 23 to be replenished (step S5) In this process, if the selected tablet cassette 20 is other than one containing the correct tablets 23, the operator is informed of an error by the touch panel.

Subsequently, the operator places the empty tablet cassette 20 on the scale, where if the operator presses the "Tare" button on the touch panel (step S6), then the scale is initialized, prompting the operator to operate the bulk bottle for verification (step S7). If the verified bulk bottle is erroneous, the result is displayed on the touch panel, thereby notifying the operator of the error. If the verification result is correct, then the operator is prompted to pour in a desired quantity of medication into the scale. Then, if the operator has poured oral medication into the tablet cassette 20 on the scale (step S8), the scale counts the total medications poured into the tablet cassette 20 (step S9) In this case, if too much medication is poured in, a warning is presented on the touch panel.

Next, the operator operates a button on the touch panel, where if an end of the counting process is confirmed (step S10), then the final quantity is stored in the database (step S11 ). Subsequently, the operator is prompted to enter the manufacturer's lot number and expiration date according to the indication on the bulk bottle (step S12). Also, an alphanumeric keypad is displayed on the touch panel for the operator to key in values (step S13). If the operator has keyed in the manufacturer's lot number and expiration date and confirmed by touching an appropriate button on the touch panel (step S14), then the database is updated so that the lot number and expiration date are rewritten to the new ones (step S15).

After that, in order to verify a correct return place for the replaced tablet cassette 20, the operator is prompted to scan the bar code of cassette location (step S16), and this is displayed on the touch panel. The operator sets a new tablet cassette according to this instruction, where the operator scans the bar code of the cassette location provided just above the motor base 19 with no tablet cassette 20 set. If a bar code of a wrong position is scanned, this fact is displayed on the touch panel so that the operator is notified of it (step S17). With these steps of work completed, the operator sets the tablet cassette 20 to the motor base 19 in the corresponding position, and returns the wireless scanner to the original position (step S18).

Figure 20A:
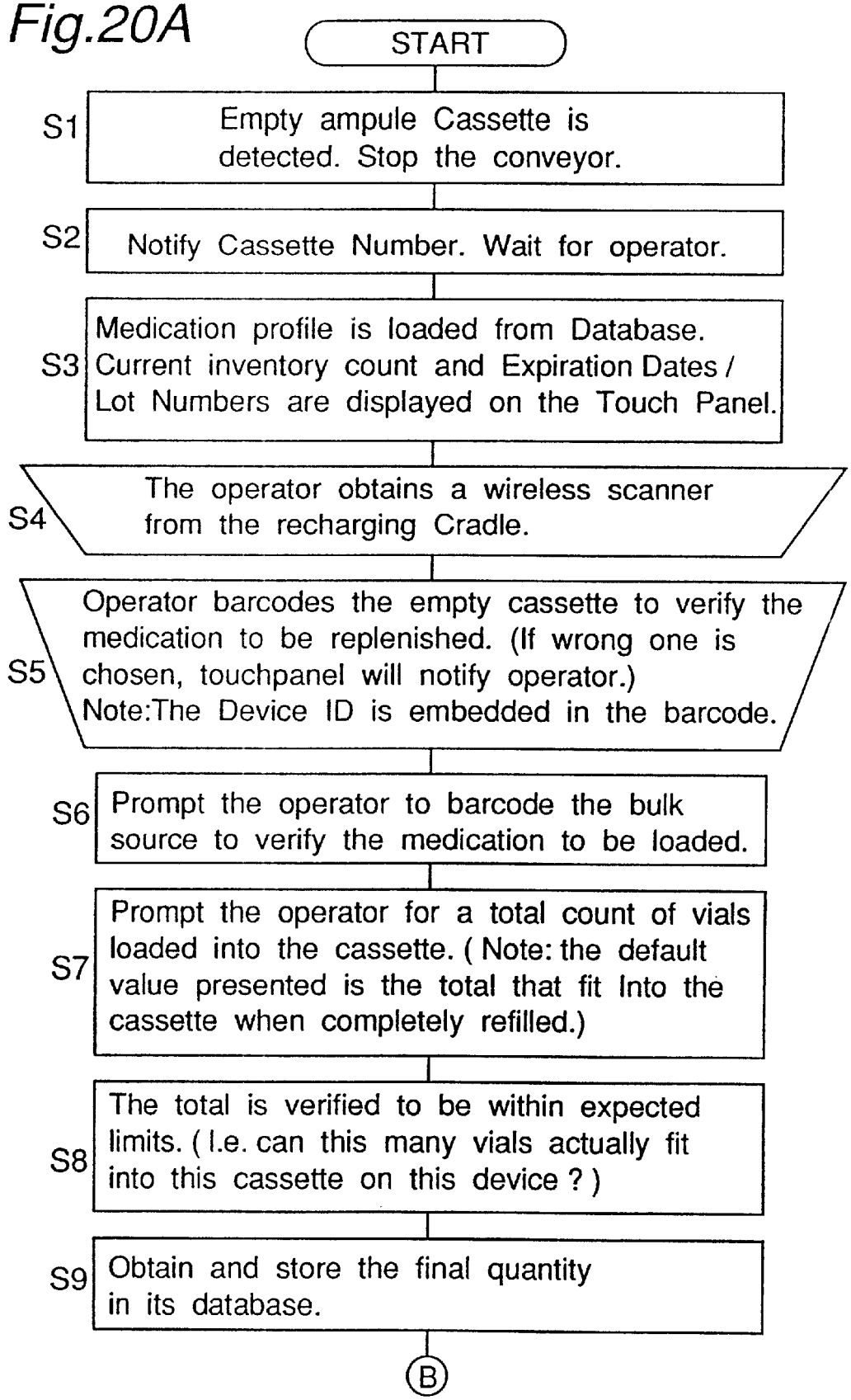
FIGS. 20A and 20B are flow charts showing the ampule replenishing work in the array ampule dispensing station or random ampule dispensing station.
Figure 20B:
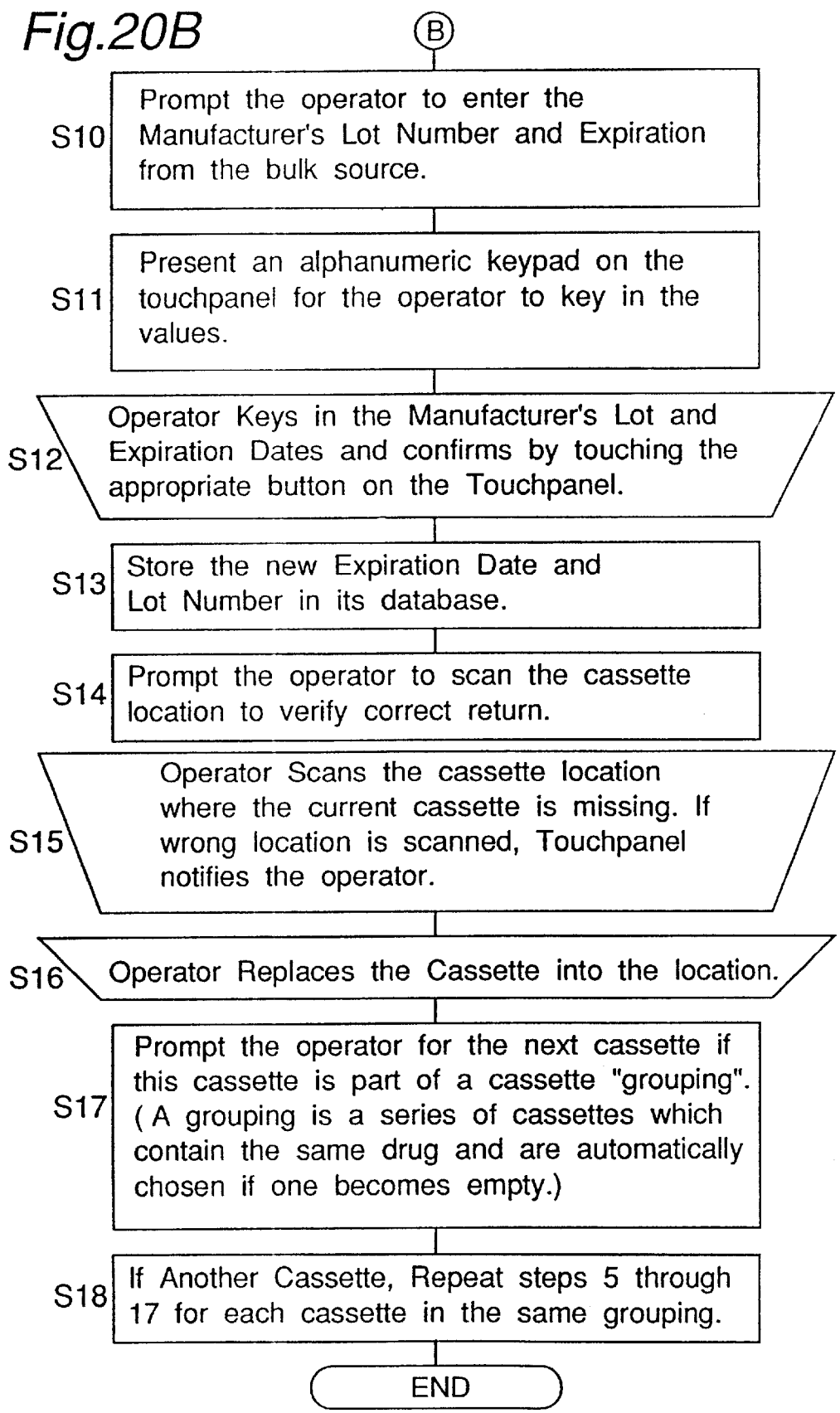

It is noted that, also for the ampule cassettes 69 and the ampule containers 82, the processes described above are carried out similarly according to the flow charts shown in FIGS. 20A and 20B.

Consumables Management Operation

Also, in this medication collecting system, the consumption state of consumable articles (printing ink, package belt and the like) in the units can be detected.

For example, the remaining quantity of the package belt 13 which is used in the tablet dispensing station 4 is calculated based on an initial length and a length required per package. Similarly, the remaining quantity of the tape band 54 for the bundling machine 47 which is used in the tablet dispensing station 4 is calculated based on an initial length and a band feed quantity. Further, the remaining quantity of the prescription paper 101 which is used in the label issuing station 7 is calculated by subtracting the number of printed sheets from the initial setting number of sheets each time a printing process is performed. The remaining quantity of thermal transfer ink ribbon which is used in the label issuing station 7 is calculated based on an initial length and a consumption length (the consumption length for six-line printing is 3.5 mm).

Each time the consumption state of each consumable article is detected in this way, the consumable article data is updated and it is determined whether or not the article needs to be replaced. If it is decided that the article needs to be replaced, then an instruction that, for example, "Package paper will soon be out. Do you want to replenish?", and "YES/NO" keys are displayed on the display as a replenishment operating screen. If the "YES" key is chosen, then the replacement procedure for the relevant consumable article is displayed. Then, the article is replaced according to this procedure, and if the replacement is completed, a question, "Has replacement been completed?", and "YES/NO" keys are automatically displayed. If the "YES" key is chosen, the replenishment operating screen is ended and the consumable article data is updated, followed by a return to the normal screen.

Automatic Bagging Station

Figure 21:
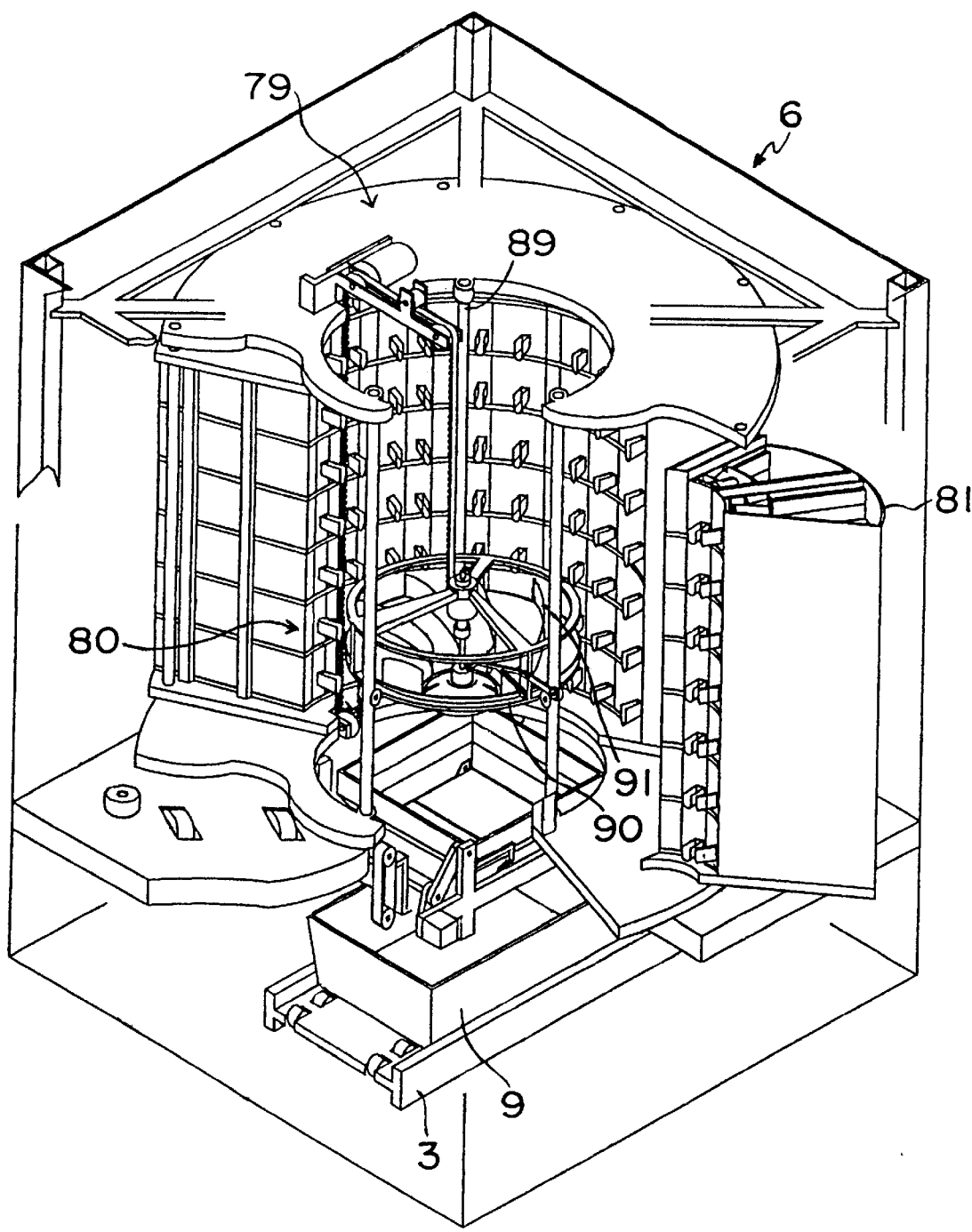
FIG. 21 is a schematic sectional view of automatic packing station that can be provided instead of the tray recovering station of FIG. 17.

An automatic bagging station shown in FIG. 21 may be adopted instead of the tray recovering station 2 (for more details, see Japanese Patent Applications HE 10203749, HE 10-75813, etc.).

In this automatic bagging station, a sheet 112 wound around a roll 111 is formed into a bag shape by a sealing part 113 and cut into bags by a cutter 114, and the bags are printed on the surfaces by a printer 115 and then conveyed to a medication feed part 116. In the medication feed part 116, with the bags opened, medicaments within the tray 9 are all put into the bags, and after sealing, the bags are accommodated in a large-size tray 117 provided below the medication feed part 116. The large-size tray 117 is conveyed sideways by a conveyor 118.

Steps of the Preferred Method

Figure 22:
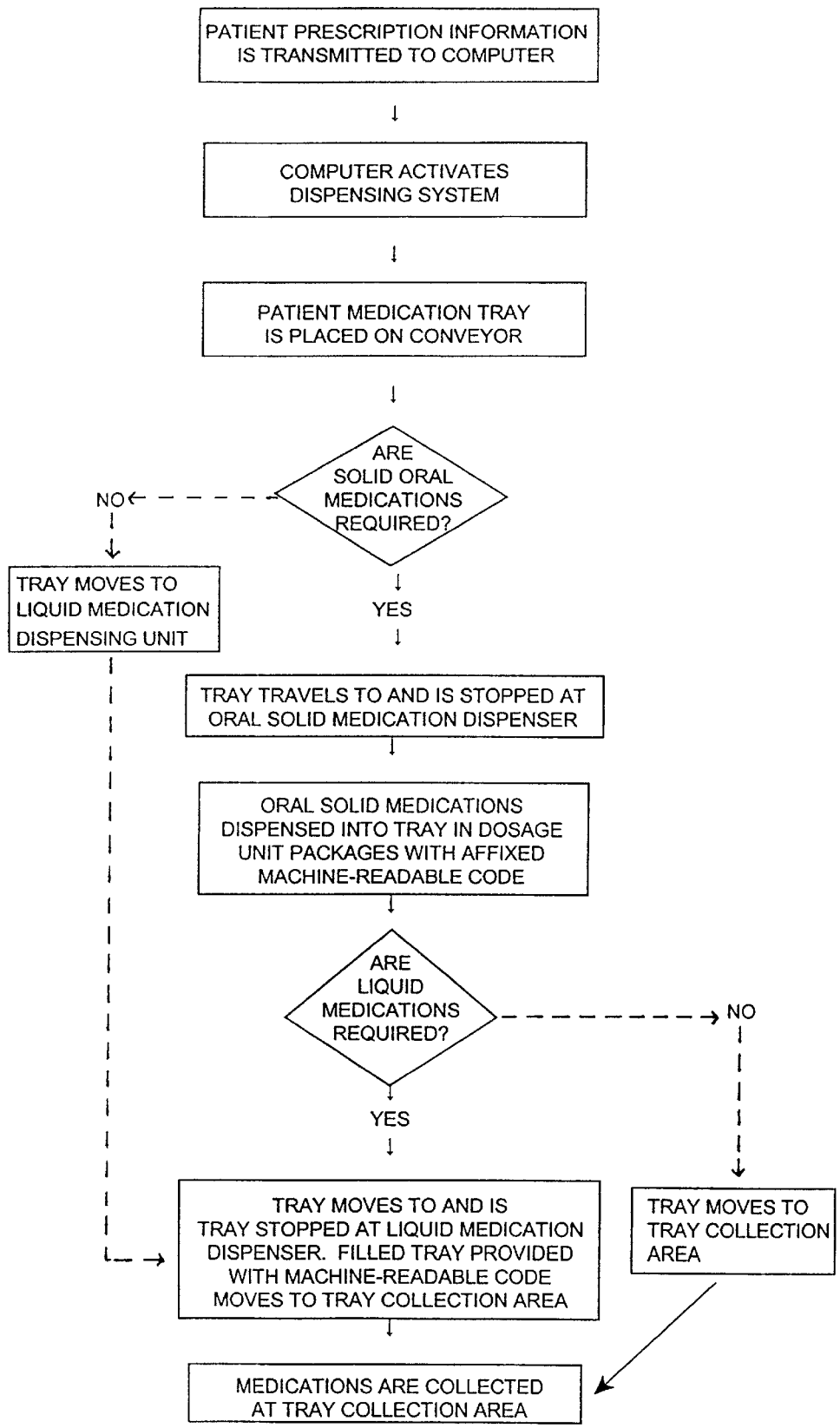
FIG. 22 is a flow diagram of a preferred embodiment of the invention.

Having described exemplary apparatus for practicing aspect of the invention and the operation of the apparatus we now turn to an example of the method. FIG. 22 is a flow chart which summarizes one form of the automated method for dispensing bulk medications with machine-readable code which may be practiced using the above-described dispensing apparatus.

According to a first step of the preferred method, at least one person's drug prescription information is provided to a computer 119 (not shown) for controlling the bulk medication dispensing system 200. Subsequently, a predetermined quantity of solid medication 23 is automatically dispensed and packaged into at least one dosage unit 13a from first bulk medication dispensing apparatus (tablet dispensing station 4) in response to a signal from computer 119 based on the person's drug prescription information. Machine-readable drug prescription information is automatically applied to the solid medication package 13a in response to a signal from computer 119 based on the drug prescription information.

A predetermined quantity of packaged liquid medication from a second bulk dispensing apparatus (such as ampule dispenser 5) is automatically dispensed in response to a signal from computer 119 based on one of the person's drug prescription information. Machine-readable drug prescription information 103 is automatically provided for application to the liquid medication package in response to a signal from the computer based on the drug prescription information. And, prescription paper 101 providing information about the entire filled prescription can also be provided. The medication packages including the machine-readable drug prescription information corresponding to the person's drug prescription are then collected.

While computer 119 initiates the filling sequence, it is contemplated that there may be intermediate steps or devices in the sequence by which the dispensing devices are controlled.

It is most preferred that the medications 23, 67, 81 be dispensed into a receptacle (such as tray 9) which is moved from dispenser to dispenser by conveyor 3 which is under the control of computer 119. Following dispensing, the tray 9 is moved by the conveyer 3 to tray collection station 1 where the patient-specific medication orders are collected for delivery to the patients.

The method may also be used to dispense dosage-based medications generally and without reference to a specific patient. Such medication may be used, for example in stocking a drug formulary.

It should be emphasized that the steps following the signal from the computer can be performed in any order and could occur simultaneously. For example, the tablet dispenser 4 and ampule dispenser 5 could be operating simultaneously, dispensing their medications when the tray 9 passes beneath the respective station. If medication from tablet dispenser 4 or ampule dispenser 5 is not required, the tray simply passes to the next station as shown in FIG. 22.

The invention may include a second computer 120 (not shown) at a site remote from computer 119 and may include entering at least one person's drug prescription information into second computer 120 and transmitting the drug prescription information from the second computer 120 to computer 119 for controlling the bulk medication dispensing apparatus 200. Computer 119 processes the information to control the bulk medication dispensing apparatus 200.

Figures 23, 24:
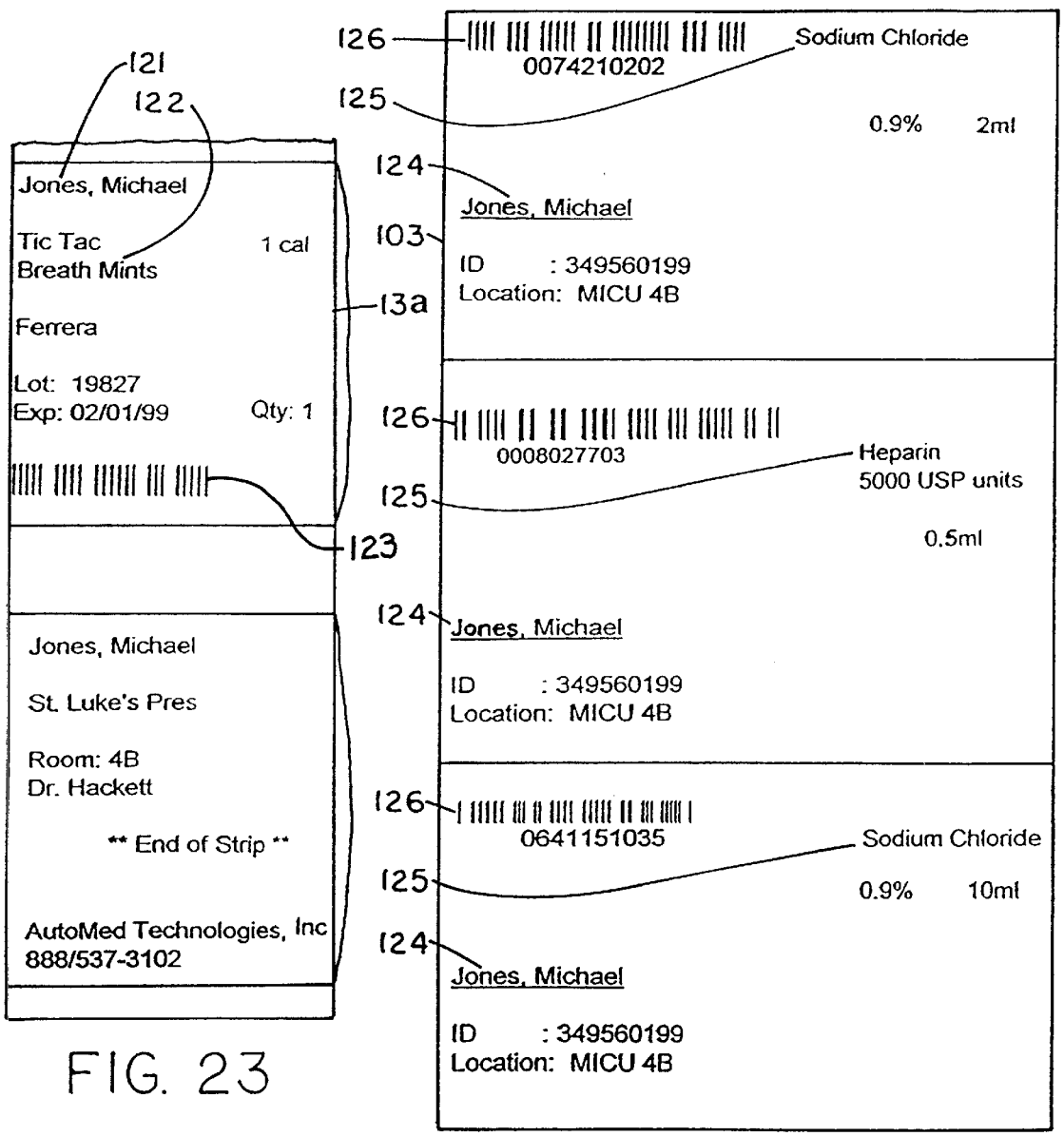
FIG. 23 is an example of an oral solid medication package including machine- readable code.
FIG. 24 is an example of machine-readable code labels for use with unit-of-use products such as liquid medications.

The method includes packaging of the solid medication 23 dispensed by tablet dispenser 4 in a continuous strip 13 and dividing the strip into at least one dosage unit such as 13a. As described above, machine-readable drug prescription information may be printed directly on the package. The machine-readable drug prescription information may alternatively be printed on a label applied to the package. FIG. 23 shows an exemplary package 13a with exemplary package information such as the patient's name 121, a description of the contents of the package 122 and a machine-readable bar code 123. Machine readable code 123 can include information customized to the operator's needs including patient name, doctor name, dosage instructions and other patient-specific information.

The method may further include the step of applying the machine-readable drug prescription information to a liquid medication package 67, 81 such as with the label information shown in FIG. 24. The information is preferably printed on perforated adhesive-backed paper 103 such as that shown in FIG. 24 and can simply be peeled off of the paper and applied to the liquid medication package 67, 81. FIG. 24 shows exemplary information such as the patient's name 124, a description of the contents of the package 125 and a machine-readable bar code 126 which can include information customized to the operator's needs including patient name, doctor name, dosage instructions and other patient-specific information.

As shown in FIG. 25, dosage instructions 101 including patient identification 127 information, human-readable dosage instructions 131 and machine-readable code 128 may be placed in tray 9 by printer 7. As in the case of the bar codes 123, 126 on the packages, the codes 128 on the instructions can include information tailored to the operator's request such as that described above. The machine-readable code need not be limited to bar codes and can include any suitable code.

The method can include further steps for utilizing the machine-readable code provided for the medication packages. Thus, for example, the method can include use of the information to verify that the correct unit dosage has been assigned to a patient. This can be accomplished by scanning the machine-readable code 123, 126 and/or 128 with any suitable scanner device 129 (not shown), transmitting the scanned code to the computer 119 and generating a signal from computer 119 to confirm that the packages correspond to the patient's drug prescription information.

Another use of the information is to verify that the correct medication is being given to the patient, for example, at the patient's bedside in a hospital. This could be performed by a nurse prior to the patient taking the medication. This method comprises the further steps of scanning the machine-readable code 123, 126 and/or 128, transmitting the scanned code to the computer 119, scanning machine-readable code 130 on the person's medical records (not shown), transmitting the scanned code to the computer 119 and generating a signal from computer 119 to confirm that the medication is suitable for the person. It is contemplated that the information scanned into computer 119 would be used for other purposes such as billing the patient or the patient's insurer for the medication.

While the principles of this invention have been described in connection with specific embodiments, it should be understood clearly that these descriptions are made only by way of example and are not intended to limit the scope of the invention.

What is claimed:

1. A method for dispensing bulk prescription medications into dosage units together with machine-readable drug prescription information comprising the steps of:

providing at least one person's drug prescription information to a computer for controlling bulk medication dispensing apparatus;

automatically dispensing and packaging a predetermined quantity of solid medication into at least one dosage unit from a first bulk medication dispensing apparatus in response to a signal from the computer based on the person's drug prescription information;

automatically applying machine-readable drug prescription information to the solid medication package in response to a signal from the computer based on the drug prescription information;

automatically dispensing a predetermined quantity of packaged liquid medication from a second bulk dispensing apparatus in response to a signal from the computer based on the person's drug prescription information;

automatically providing machine-readable drug prescription information for application to the liquid medication package in response to a signal from the computer based on the drug prescription information; and collecting the medication packages including the machine-readable drug prescription information corresponding to the person's drug prescription.

2. The method of claim 1 further including a second computer at a site remote from the computer for controlling the bulk medication dispensing apparatus and comprising the further steps of:

entering at least one person's drug prescription information into the second computer; and transmitting the drug prescription information from the second remote computer to the computer for controlling the bulk medication dispensing apparatus; whereby the computer for controlling the bulk medication dispensing computer uses the information to control the bulk medication dispensing apparatus.

3. The method of claim 1 wherein the solid medication packaging step includes packaging the solid medication in a continuous strip.

4. The method of claim 3 further including the step of dividing the strip into the at least one dosage unit.

5. The method of claim 1 wherein the step of applying machine-readable drug prescription information to the solid medication package comprises printing the information directly on the package.

6. The method of claim 5 wherein the machine-readable drug prescription information comprises a bar code.

7. The method of claim 1 further including the step of applying the machine-readable drug prescription information to the liquid medication package.

8. The method of claim 7 wherein the machine-readable drug prescription information comprises a bar code.

9. The method of claim 8 wherein the liquid medication is packaged in unit-of-use ampules.

10. The method of claim 1 wherein the method further comprises the steps of:

scanning the machine-readable code on the packages;

transmitting the scanned code to the computer; and generating a signal from the computer to confirm that the packages correspond to the person's drug prescription information.

11. The method of claim 1 wherein the method further comprises the steps of:

scanning the machine-readable code on the packages;

transmitting the scanned code to the computer;

scanning machine-readable code on the person's medical records;

transmitting the scanned code to the computer; and generating a signal from the computer to confirm that the medication is suitable for the person.

12. A method for dispensing bulk prescription medications together with machine-readable drug prescription information comprising the steps of:

providing at least one person's drug prescription information to a computer for controlling at least bulk medication dispensing apparatus and conveyor apparatus for transporting medication-holding receptacles to and from at least one bulk medication dispensing apparatus;

automatically dispensing and packaging at least one dosage unit of a predetermined quantity of solid medication from a first bulk medication dispensing apparatus containing a plurality of different medications in response to a signal from the computer based on the person's drug prescription information;

automatically applying machine-readable drug prescription information to the solid medication package in response to a signal from the computer based on the drug prescription information;

automatically dispensing the person's packaged, labeled solid medication into a receptacle on a conveyor;

automatically dispensing a predetermined quantity of packaged liquid medication from a second bulk dispensing apparatus in response to a signal from the computer based on the person's drug prescription information;

automatically providing machine-readable drug prescription information for application to the liquid medication packages in response to a signal from the computer based on the drug prescription information;

automatically dispensing the person's liquid medication and machine-readable drug prescription information into a receptacle on a conveyor; and transporting the receptacle on the conveyor to a receptacle collection area.

13. The method of claim 12 further including a second computer at a site remote from the computer for controlling the bulk medication dispensing apparatus and comprising the further steps of:

entering at least one person's drug prescription information into the second computer; and transmitting the drug prescription information from the second remote computer to the computer for controlling the bulk medication dispensing apparatus; whereby the computer for controlling the bulk medication dispensing apparatus computer uses the information to control the bulk medication dispensing apparatus and conveyor.

14. The method of claim 12 wherein the solid medication packaging step includes packaging the solid medication in a continuous strip.

15. The method of claim 14 further including the step of dividing the strip into the at least one dosage unit.

16. The method of claim 14 wherein the step of applying machine-readable drug prescription information to the solid medication package comprises printing the information directly on the package.

17. The method of claim 16 wherein the machine-readable drug prescription information comprises a bar code.

18. The method of claim 12 further including the step of applying the machine-readable drug prescription information to the liquid medication package.

19. The method of claim 12 wherein the method further comprises the steps of:
scanning the machine-readable code on the packages;
transmitting the scanned code to the computer; and
generating a signal from the computer to confirm that the packages correspond to the person's drug prescription information.

20. A method for dispensing bulk medications together with machine-readable drug prescription information identifying the medications comprising the steps of:
providing drug dispensing information to a computer for controlling bulk medication dispensing apparatus;
automatically dispensing and packaging in at least one dosage unit a predetermined quantity of solid medication from a first bulk medication dispensing apparatus in response to a signal from the computer based on the drug dispensing information;
automatically applying machine-readable drug identifying information to at least one solid medication package in response to a signal from the computer based on the drug dispensing information;
automatically dispensing a predetermined quantity of packaged liquid medication from a second bulk dispensing apparatus in response to a signal from the computer based on the drug dispensing information;
automatically providing machine-readable drug identifying information for application to the liquid medication package in response to a signal from the computer based on the drug dispensing information; and
collecting the medication packages including the machine-readable drug identifying information.

21. The method of claim 20 wherein the step of applying machine-readable drug prescription information to the solid medication package comprises printing the information directly on the package.

22. The method of claim 21 wherein the machine-readable drug prescription information comprises a bar code.

23. The method of claim 20 further including the step of applying the machine-readable drug prescription information to the liquid medication package.

24. The method of claim 23 wherein the machine-readable drug prescription information comprises a bar code.

25. A method for dispensing bulk prescription medications from at least a first bulk medication dispensing apparatus for dispensing solid medication and a second bulk medication dispensing apparatus for dispensing packaged liquid medication, said medications being dispensed into dosage units together with machine-readable drug prescription information, the method comprising the steps of:
providing at least one person's drug prescription information to a computer for controlling the bulk medication dispensing apparatus;
if the prescription information includes solid-medication information, automatically dispensing and packaging a predetermined quantity of the solid medication into at least one dosage unit from the first bulk medication dispensing apparatus in response to a signal from the computer based on the solid-medication information;
automatically applying machine-readable drug prescription information to the solid medication package in response to a signal from the computer based on the solid-medication information;
if the prescription information includes liquid-medication information, automatically dispensing a predetermined quantity of the packaged liquid medication from the second bulk dispensing apparatus in response to a signal from the computer based on the liquid-medication information;
automatically providing machine-readable drug prescription information for the packaged liquid medication in response to a signal from the computer based on the liquid-medication information; and
collecting the person's medication packages, including the machine-readable drug prescription information related thereto.

26. The method of claim 25 further including a second computer at a site remote from the computer for controlling the bulk medication dispensing apparatus and comprising the further steps of:
entering at least one person's drug prescription information into the second computer; and
transmitting the drug prescription information from the second computer to the computer for controlling the bulk medication dispensing apparatus;
whereby the computer for controlling the bulk medication dispensing apparatus uses the information to control the bulk medication dispensing apparatus.

27. The method of claim 26 wherein the solid medication packaging step includes packaging the solid medication in a continuous strip.

28. The method of claim 27 further including the step of dividing the strip into the at least one dosage unit.

29. The method of claim 27 wherein the step of applying machine-readable drug prescription information to the solid medication package comprises printing the information directly on the package.

30. The method of claim 25 wherein the machine-readable drug prescription information for application to the solid medication package comprises a bar code.

31. The method of claim 25 further including the step of applying the machine-readable drug prescription information to the liquid medication package.

32. The method of claim 25 wherein the machine-readable drug prescription information for application to the liquid medication package comprises a bar code.

33. The method of claim 25 wherein the liquid medication is packaged in unit-of-use ampules.

34. The method of claim 25 wherein the method further comprises the steps of:
    scanning the machine-readable code on the packages;
    transmitting the scanned code to the computer; and
    generating a signal from the computer to confirm that the packages correspond to the person's drug prescription information.

35. The method of claim 25 wherein the method further comprises the steps of:
    scanning the machine-readable code on the packages;
    transmitting the scanned code to the computer;
    scanning machine-readable code on the person's medical records;
    transmitting the scanned code to the computer; and
    generating a signal from the computer to confirm that the medication is suitable for the person.

* * * * *

UNITED STATES PATENT AND TRADEMARK OFFICE
CERTIFICATE OF CORRECTION

| | |
|---|---|
| PATENT NO. | : 6,370,841 B1 |
| APPLICATION NO. | : 09/454042 |
| DATED | : April 16, 2002 |
| INVENTOR(S) | : Duane S. Chudy et al. |

It is certified that error appears in the above-identified patent and that said Letters Patent is hereby corrected as shown below:

On Title Page (item 54,) after "with", delete "A".

In column 1, line 2, delete "A";
In column 2, line 48 after "invention", delete "is";
In column 4, line 6, after "of", insert --an--,
In column 4, line 12, delete extra space after "machine-";
In column 4, line 12, insert ";" after "code";
In column 5, line 59, insert "to" before "feed";
In column 6, line 6, between "cassettes" and "removably" insert --20--;
In column 7, line 41, delete "a tip" and insert --an--;
In column 8, line 3, insert "of" after "capacity";
In column 8, line 10, insert a space between "insidethe" after "inside";
In column 8, line 12, delete "1B" and insert --11B--;
In column 8, line 13, between "opened" and "and" insert a space;
In column 8, line 18, between "shape" and "are" insert --,--;
In column 8, line 57, after "80", delete " 10";
In column 9, line 19, delete "HEI 9-3071530)" and insert --HEI 9-71530).--;
In column 9, line 23, delete "under the guide by the guide blades 91";
In column 9, line 27, delete "As" and insert --In this delivery stock storage 95, as--;
In column 9, line 55, delete "laber" and insert --labeler--;
In column 10, line 2, after "108a", insert --is--;
In column 10, line 8, delete "10a" and insert --110a--;
In column 12, line 18, between "cassette" and "according" insert --20--;
In column 13, line 4, delete "HE 10203749" and insert --HE 10-203749--.

In column 15, line 54, (claim 2) the text beginning with "whereby" should be brought out to the margin.

UNITED STATES PATENT AND TRADEMARK OFFICE
CERTIFICATE OF CORRECTION

PATENT NO. : 6,370,841 B1
APPLICATION NO. : 09/454042
DATED : April 16, 2002
INVENTOR(S) : Duane S. Chudy et al.

It is certified that error appears in the above-identified patent and that said Letters Patent is hereby corrected as shown below:

In column 15, line 55, (claim 2) delete "computer" and insert --apparatus--;
In column 17, line 5, (claim 13) after "apparatus", delete "computer".

Signed and Sealed this

Twenty-second Day of August, 2006

JON W. DUDAS
*Director of the United States Patent and Trademark Office*